W. H. DAYTON, DEC'D.
J. M. DAYTON, ADMINISTRATOR.
LATCH NEEDLE MAKING MACHINE.
APPLICATION FILED NOV. 19, 1918.
1,381,810.  Patented June 14, 1921.
34 SHEETS—SHEET 17.
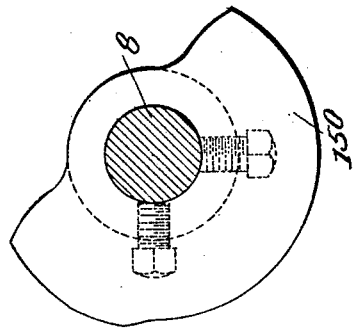
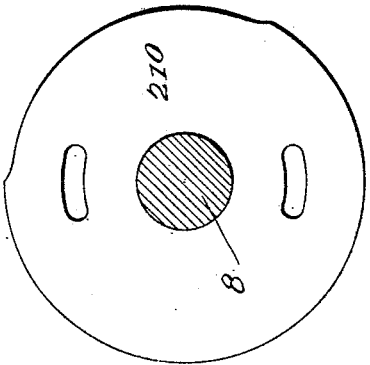
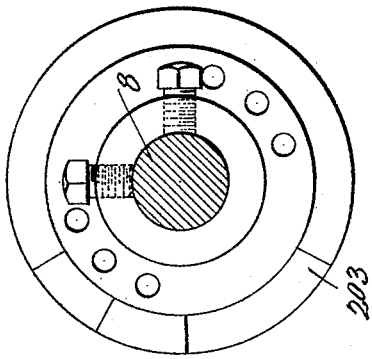
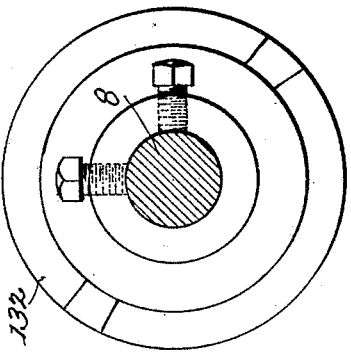
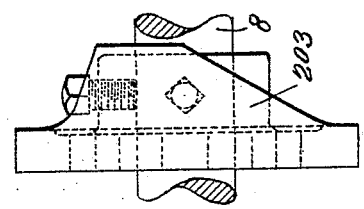
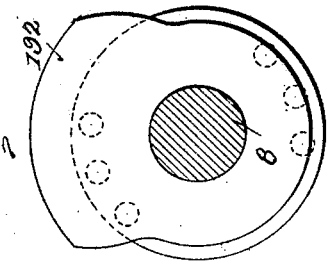
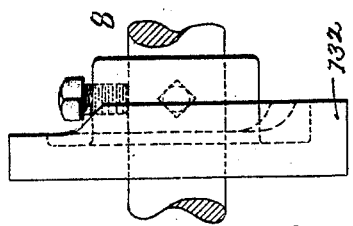
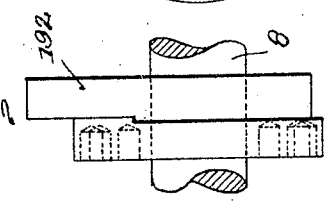

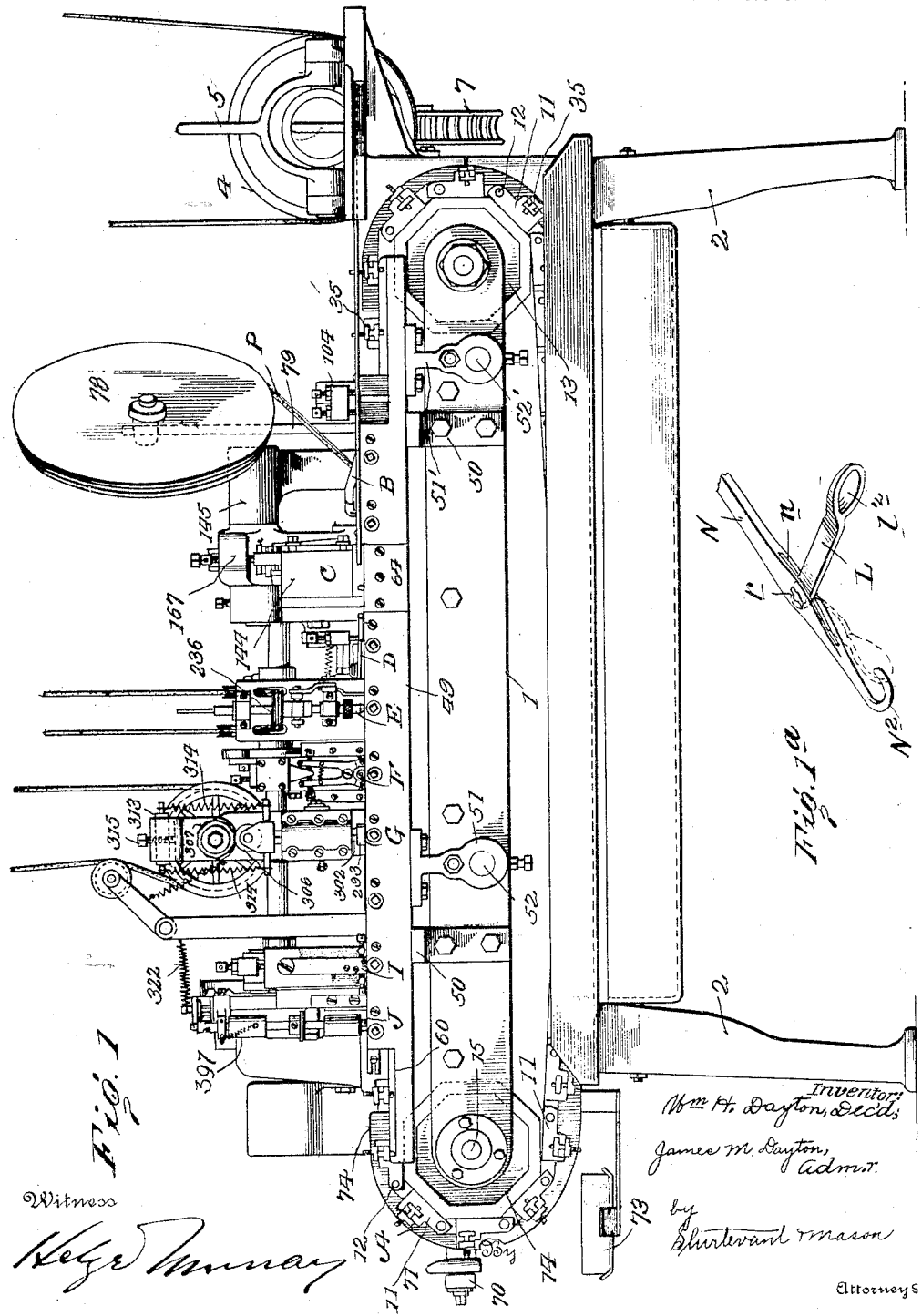

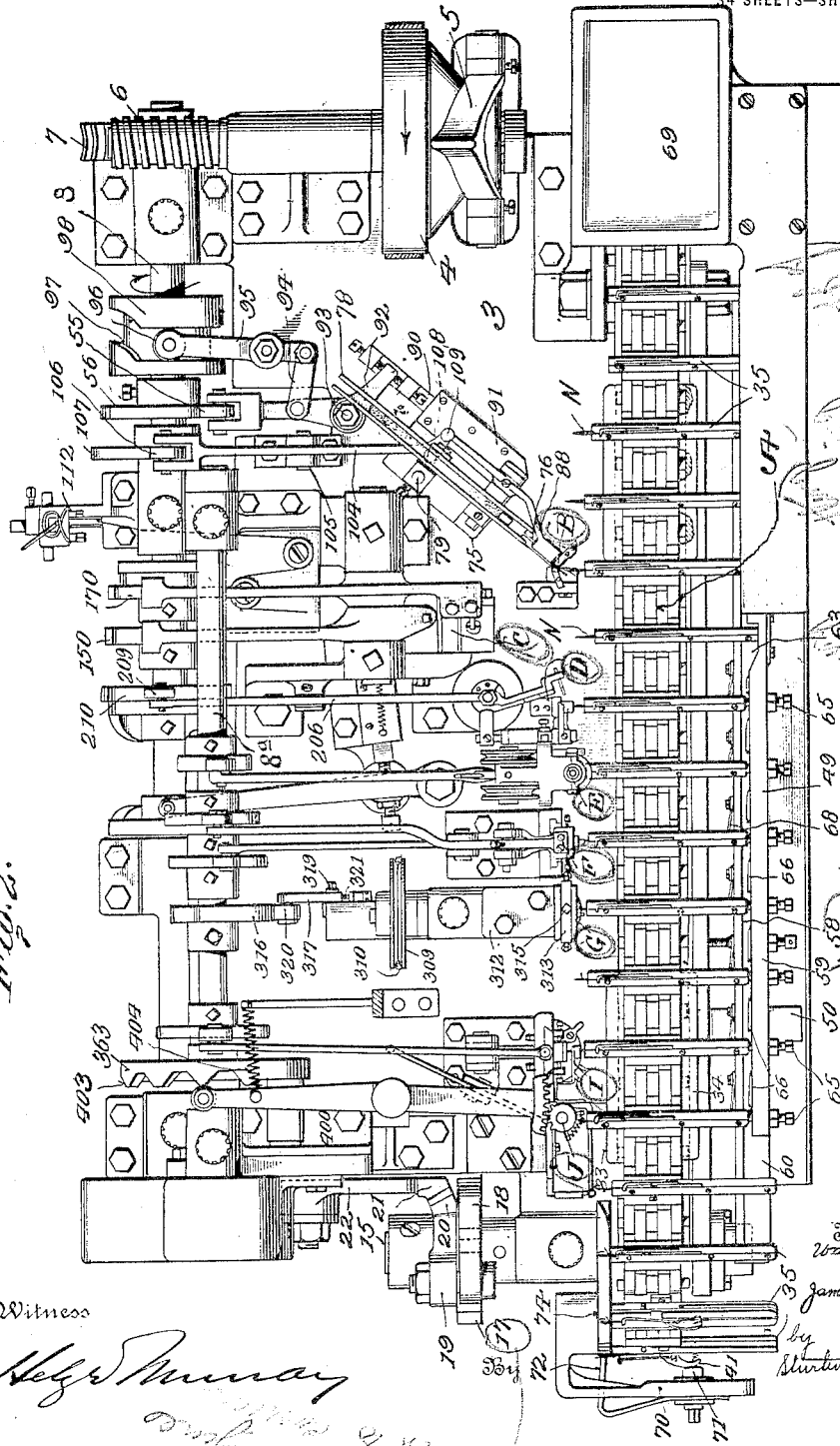

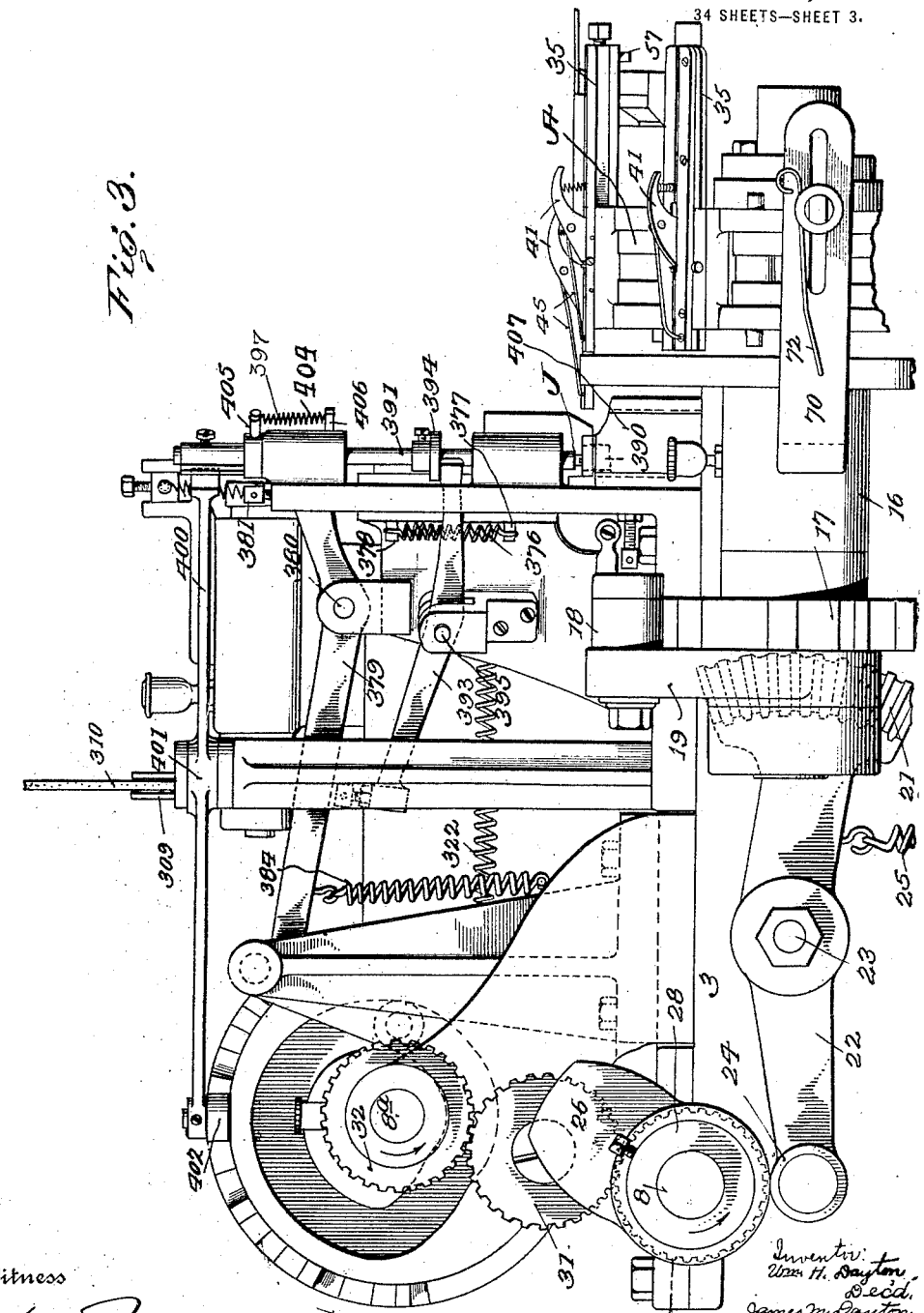

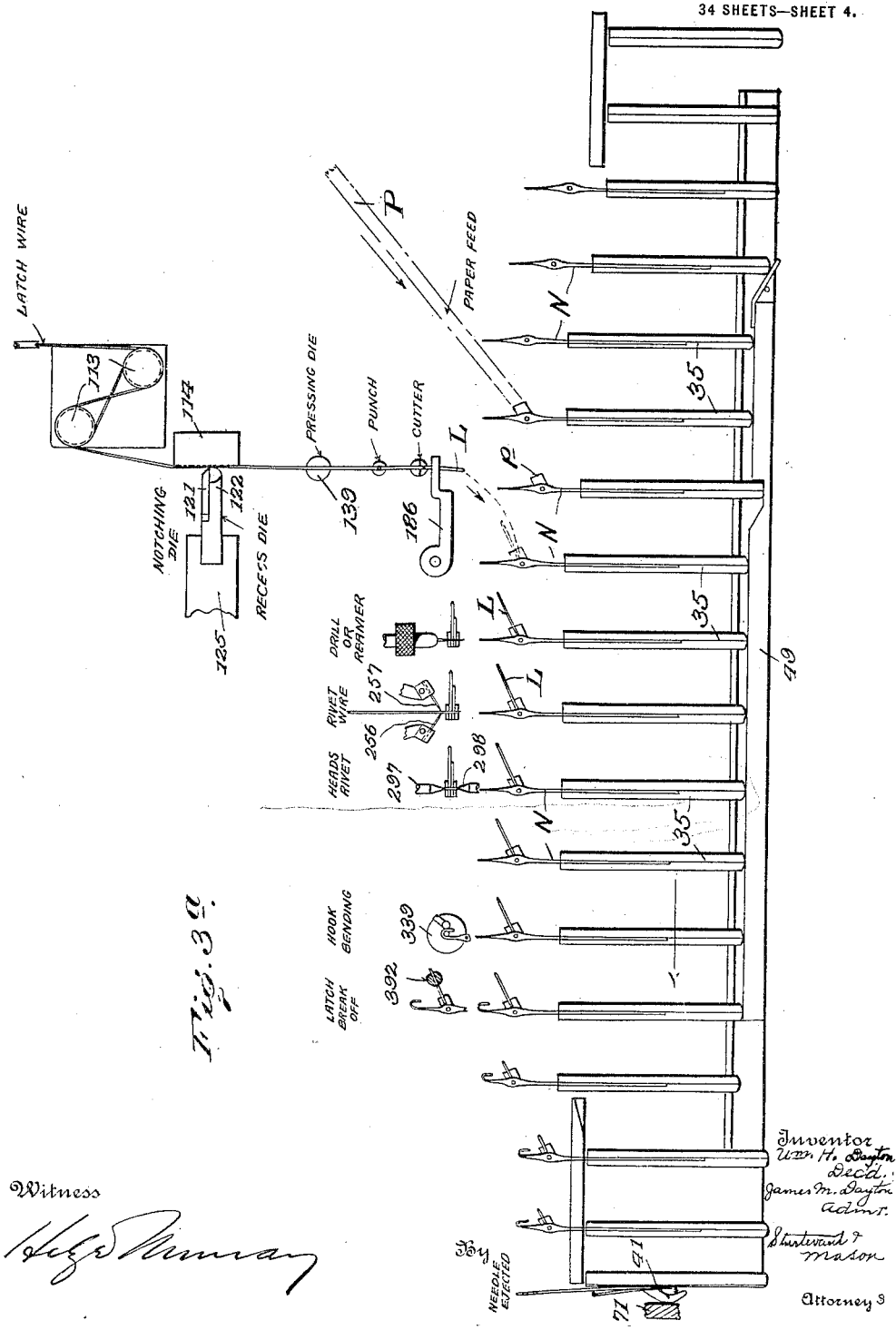

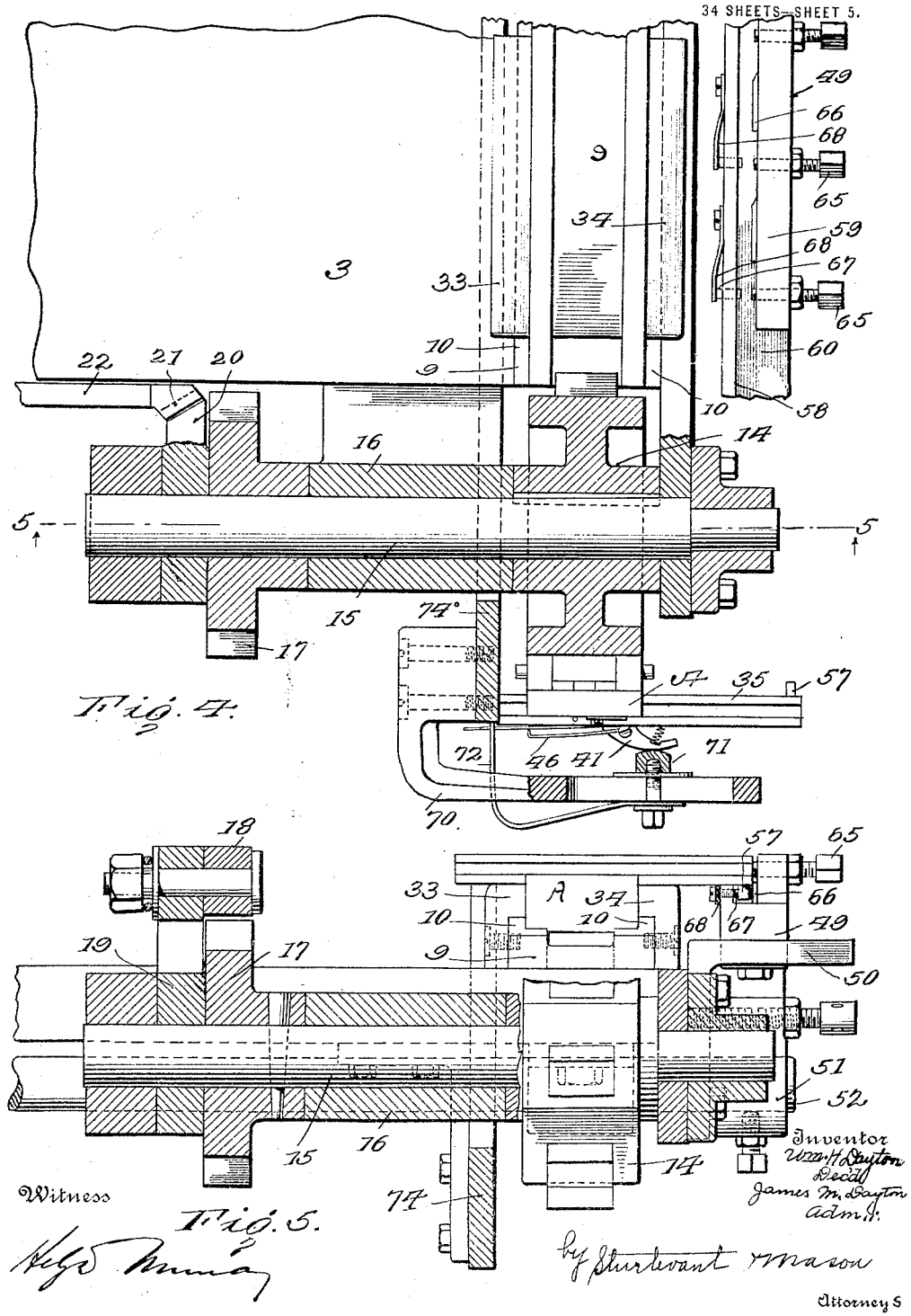

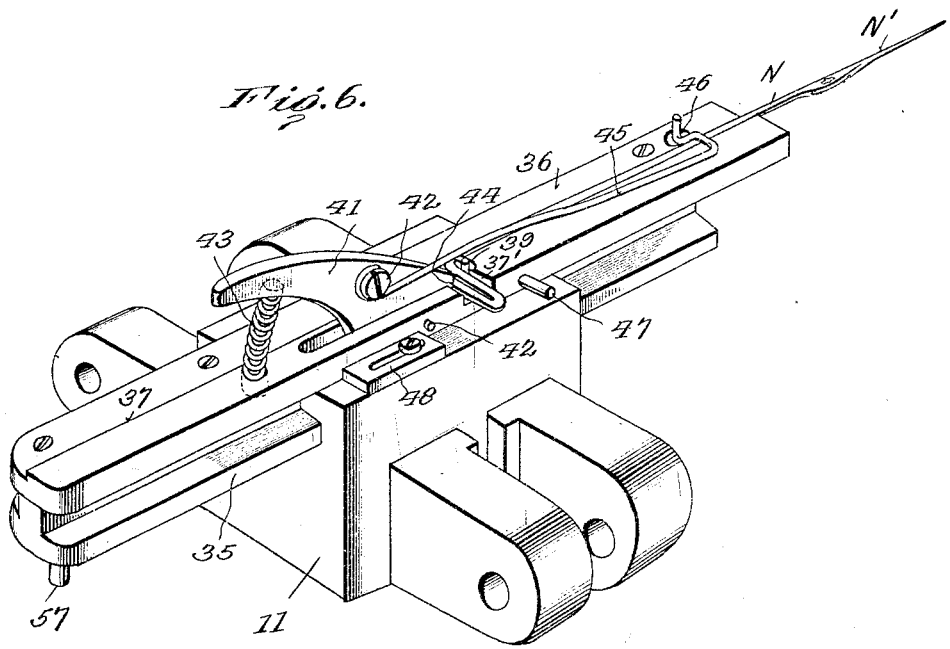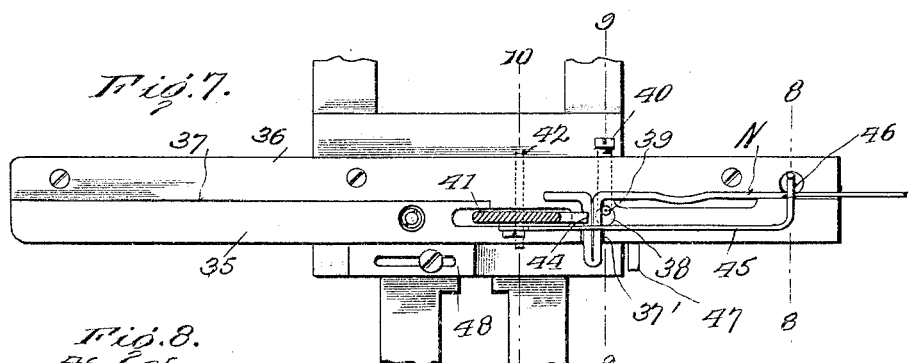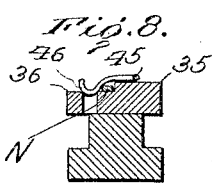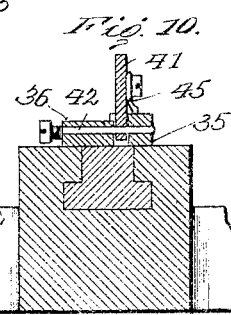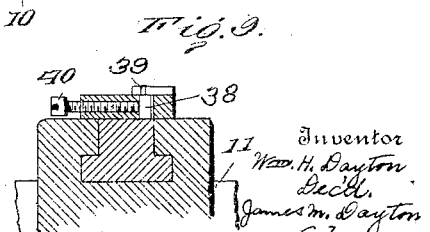

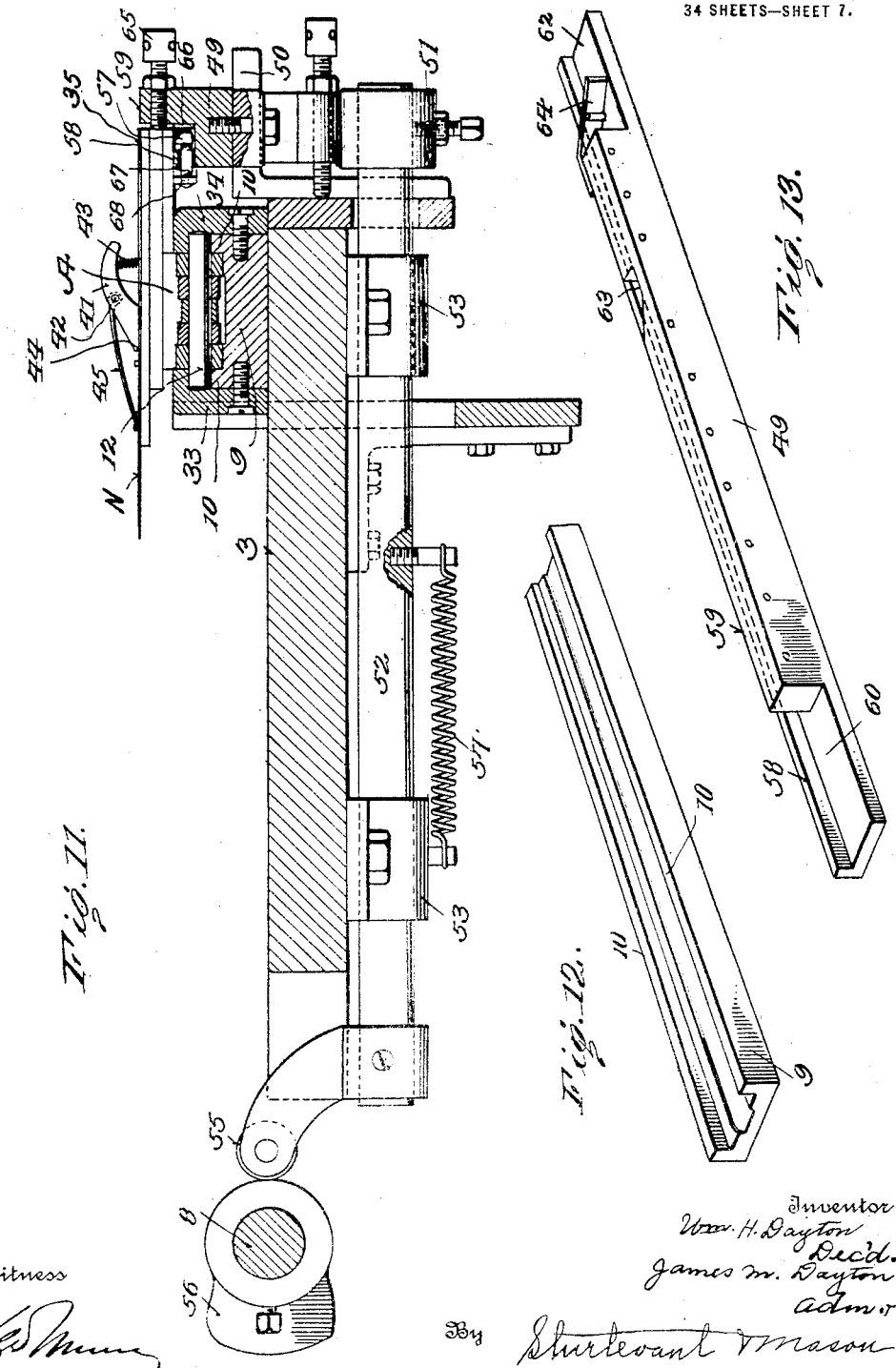

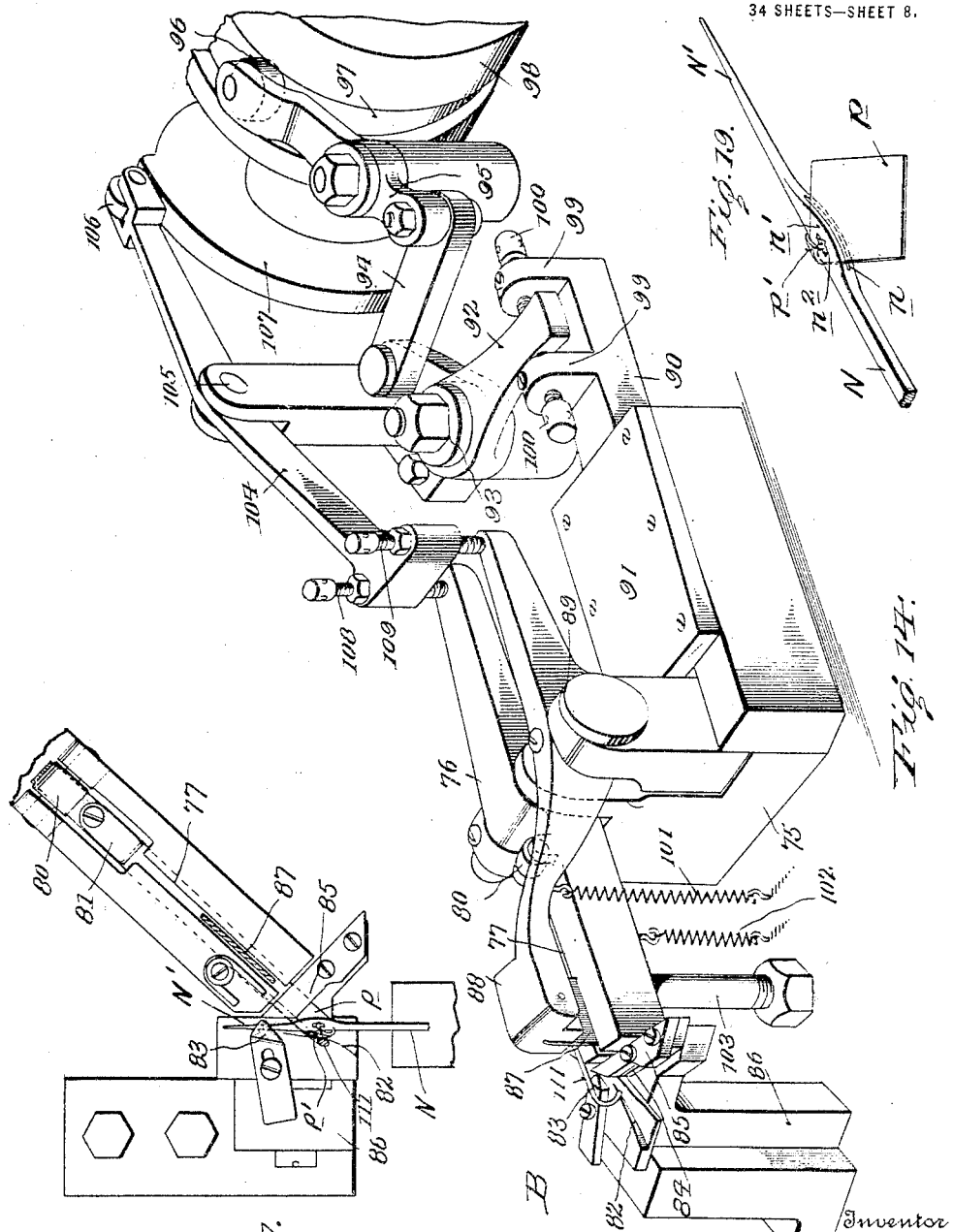

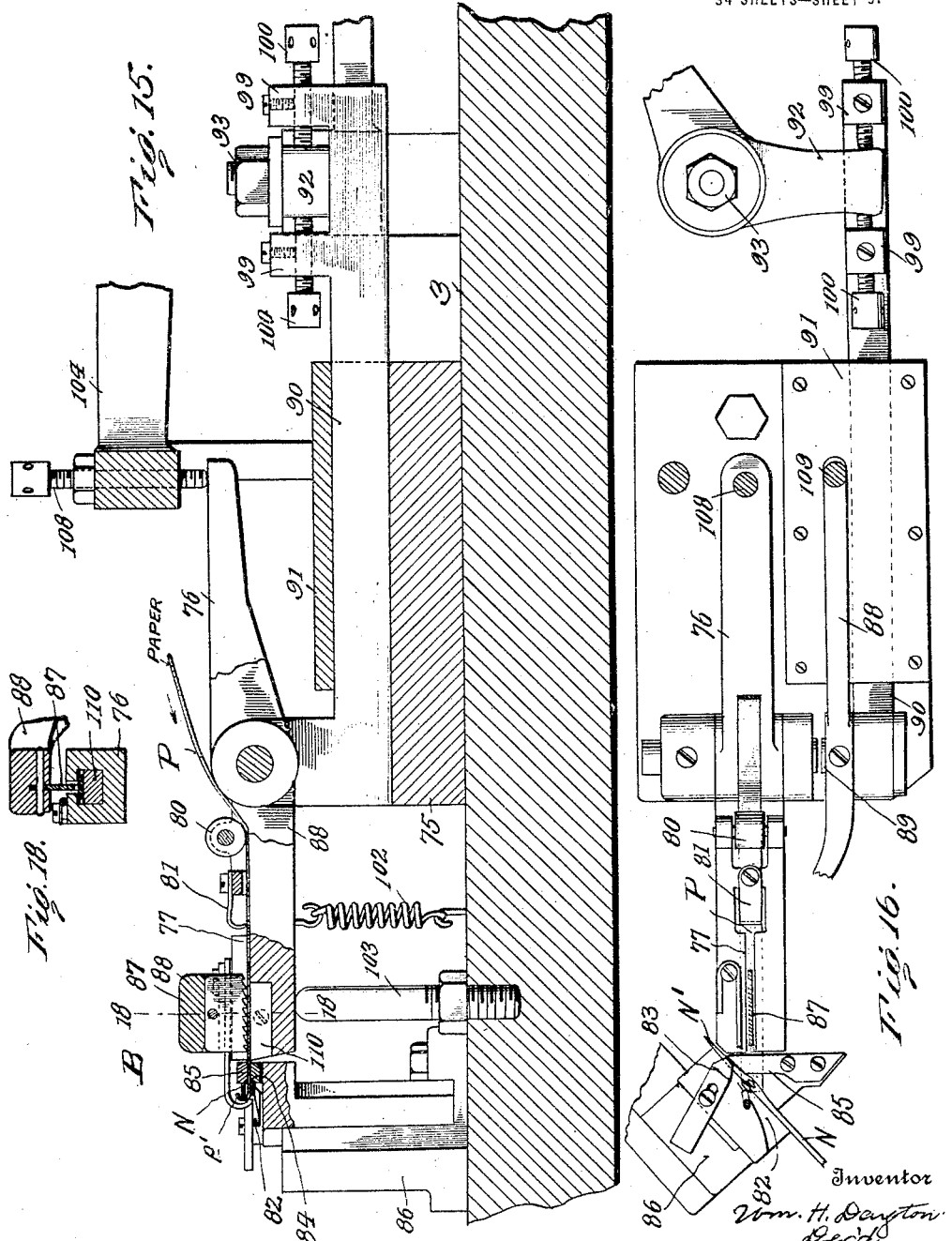

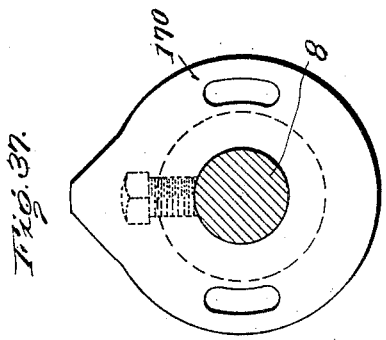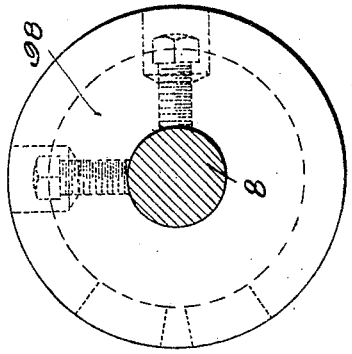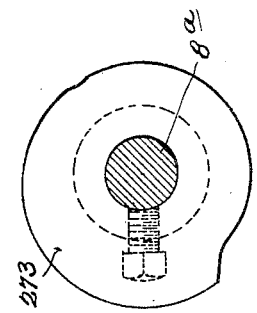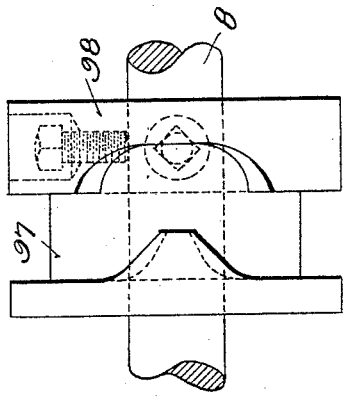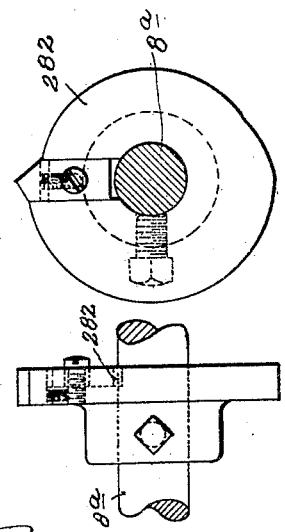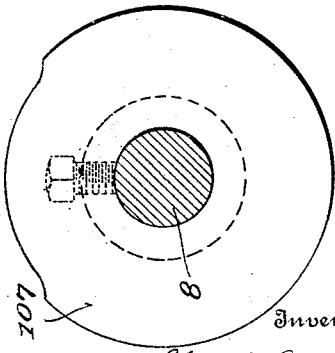

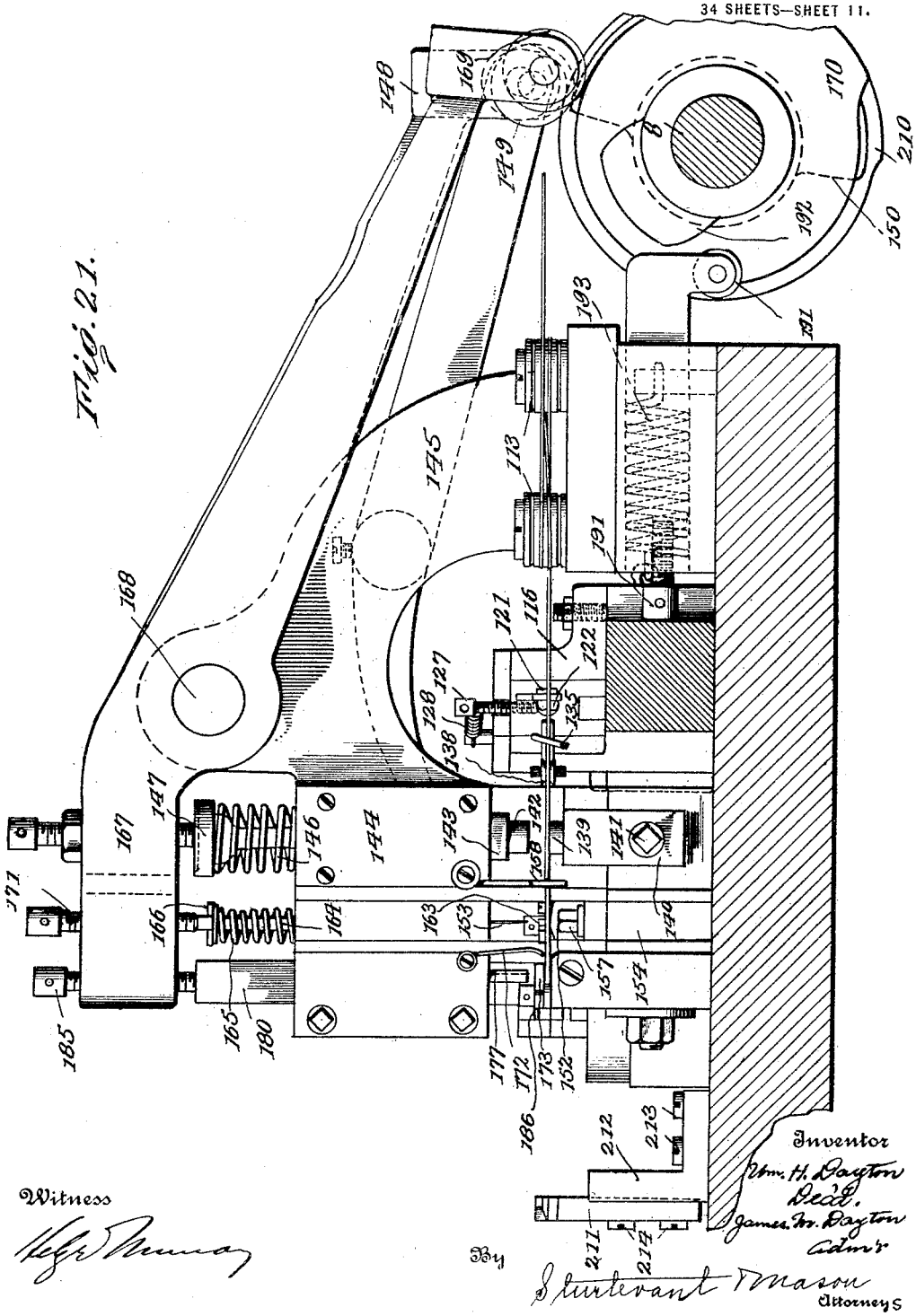

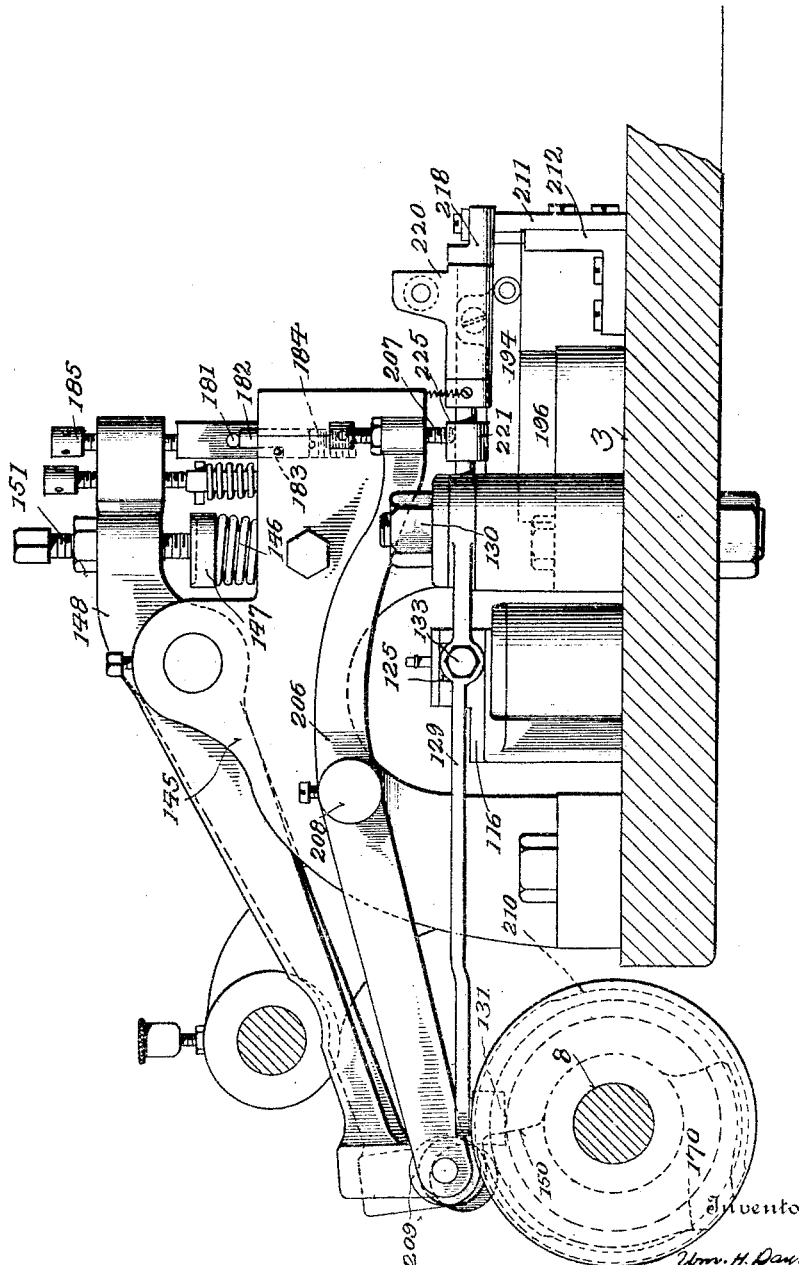

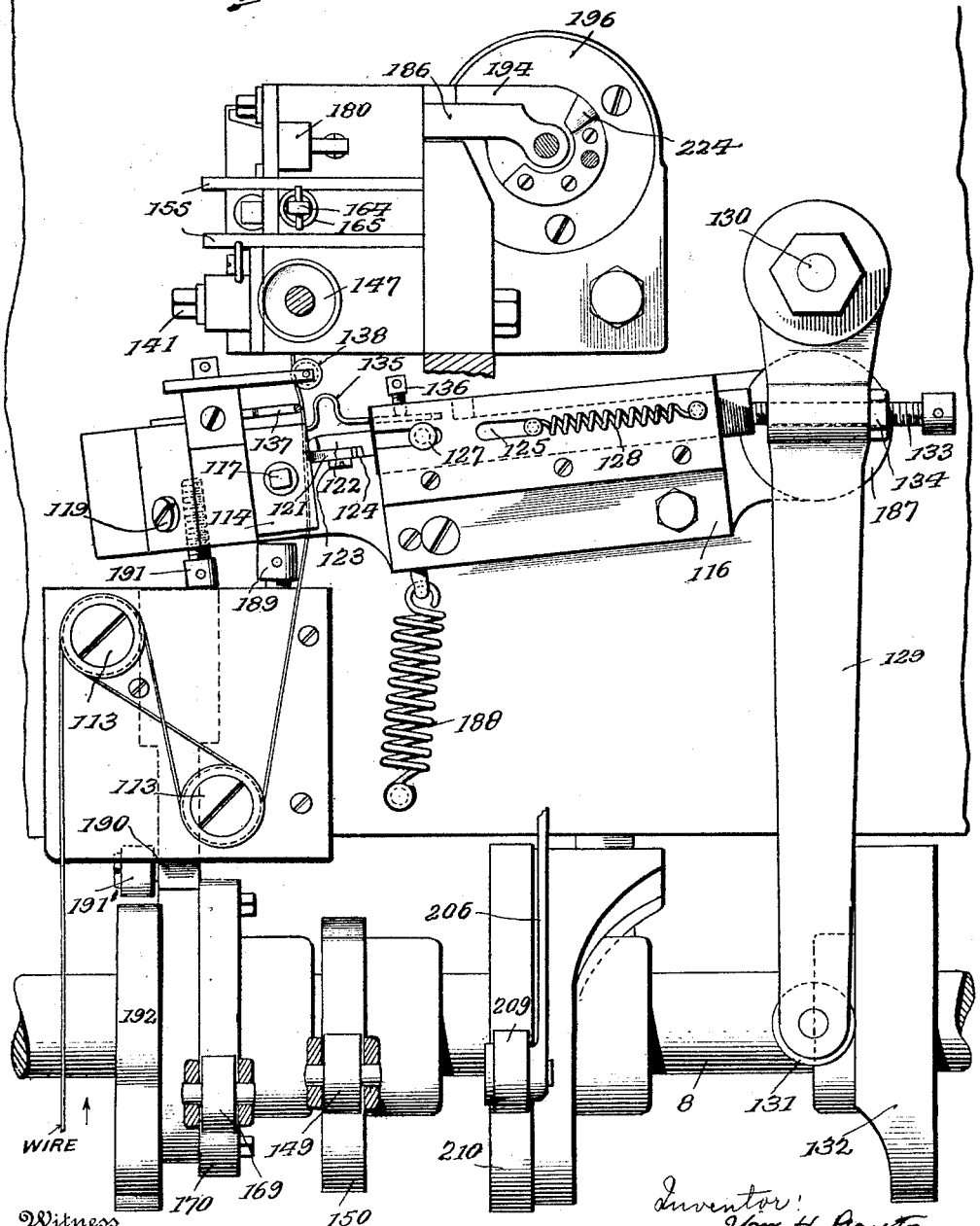

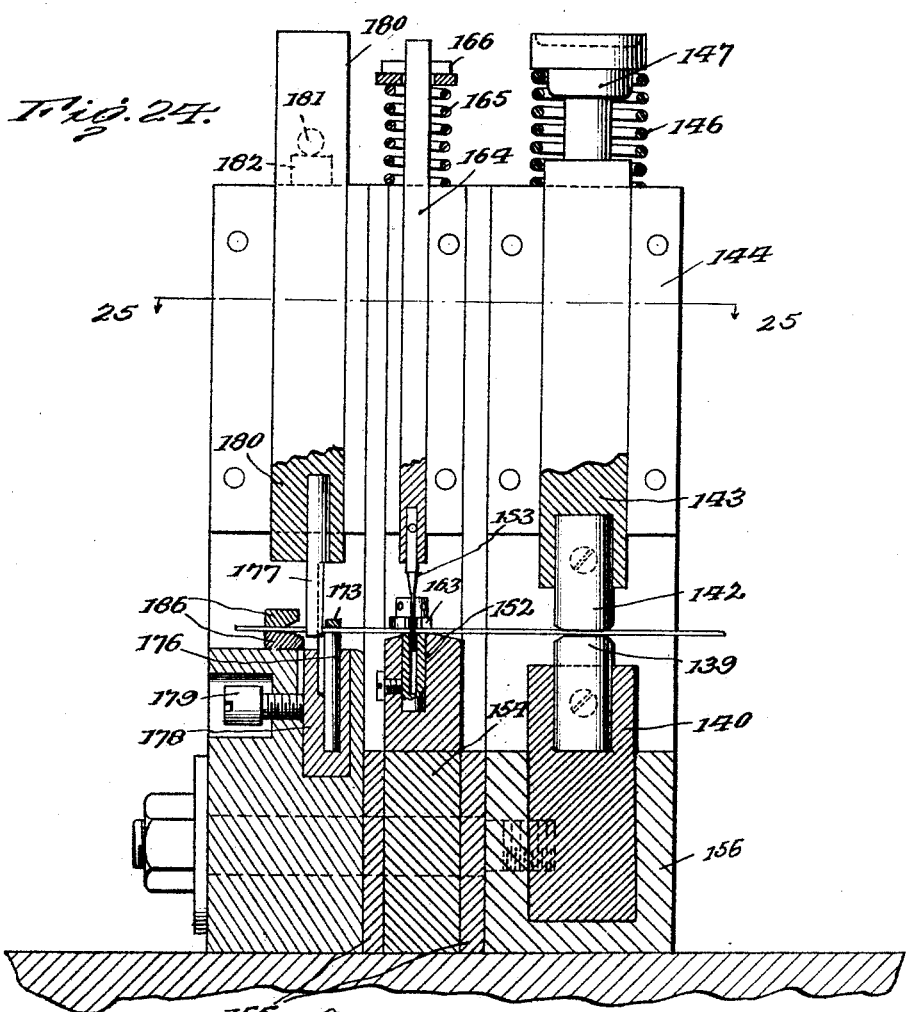

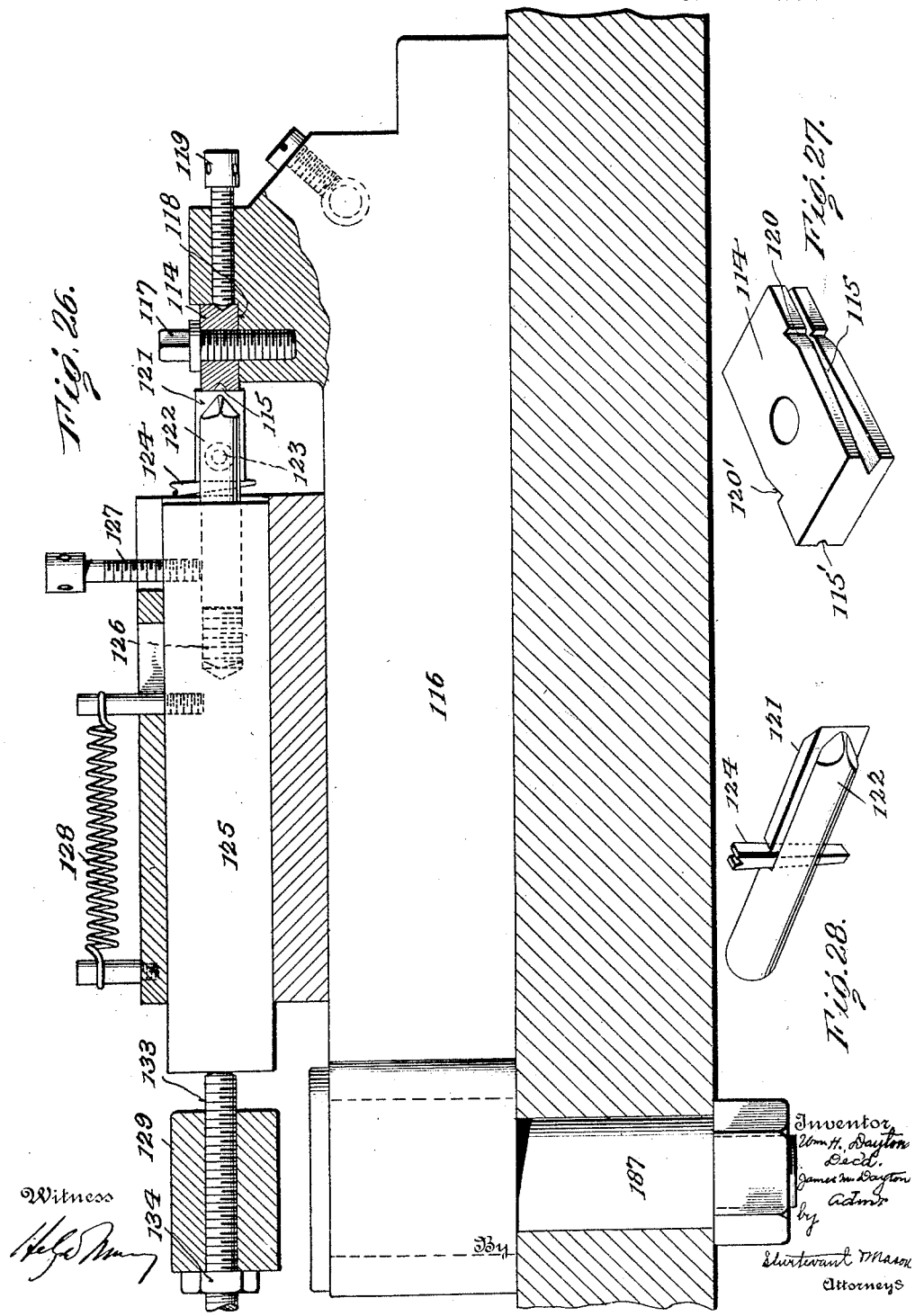

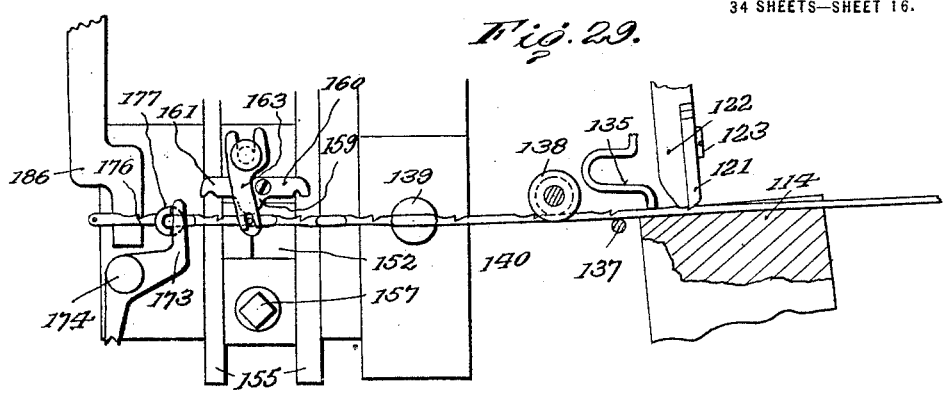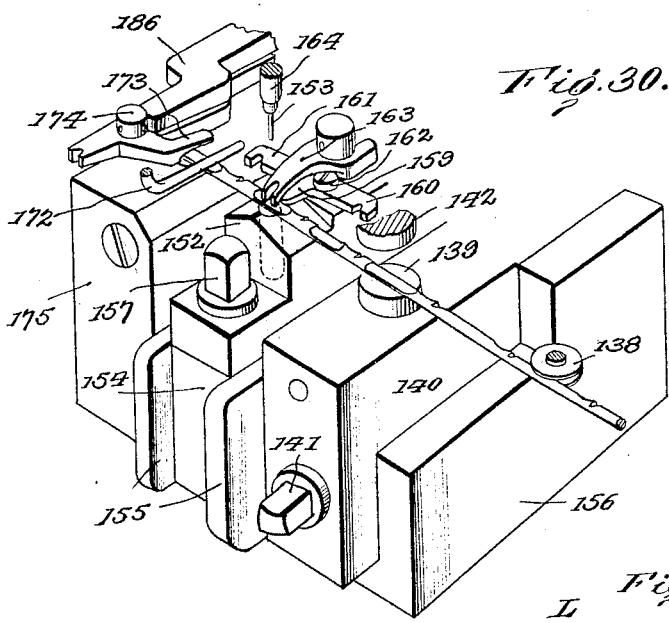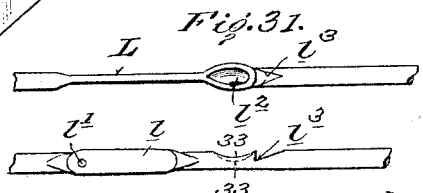

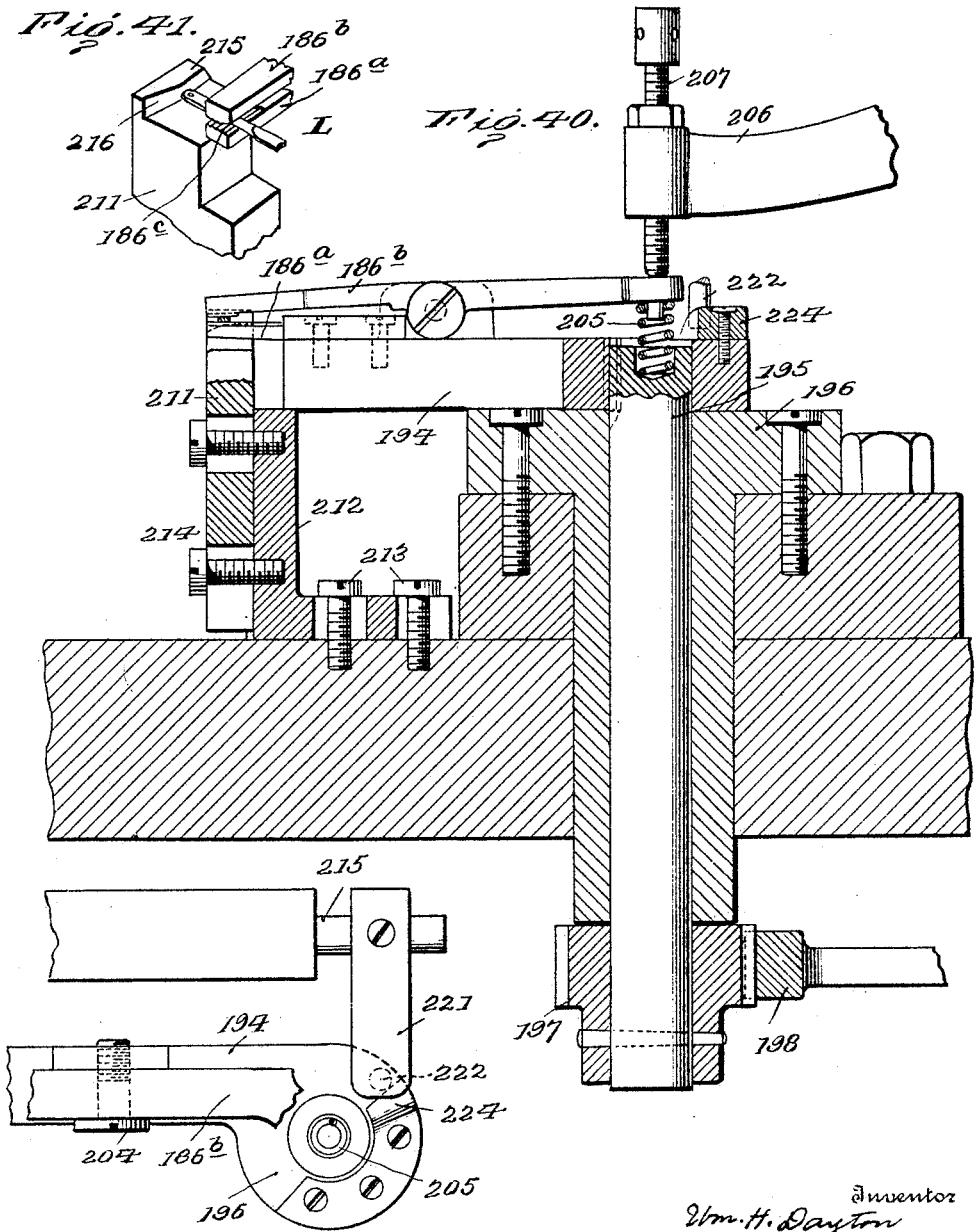

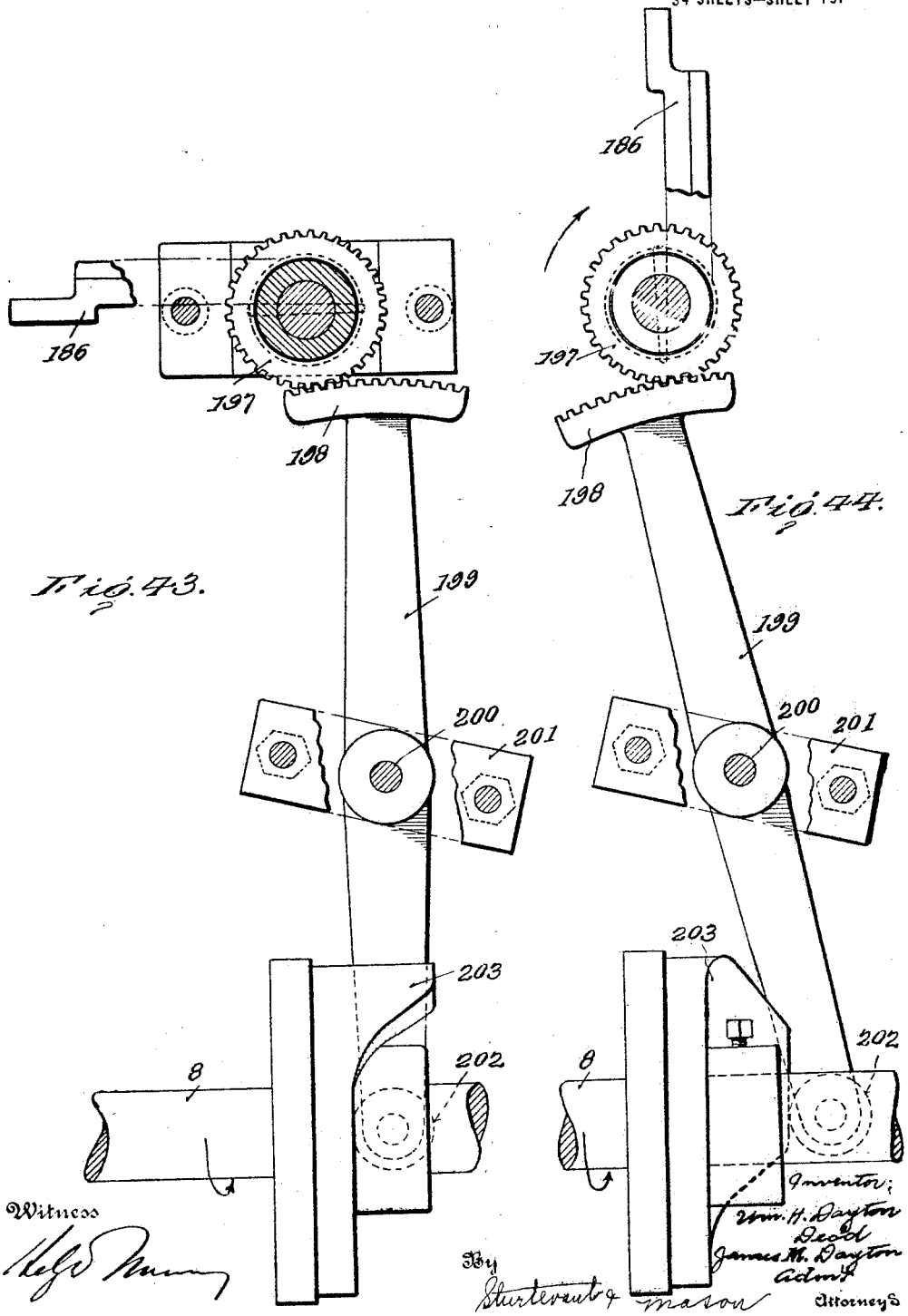

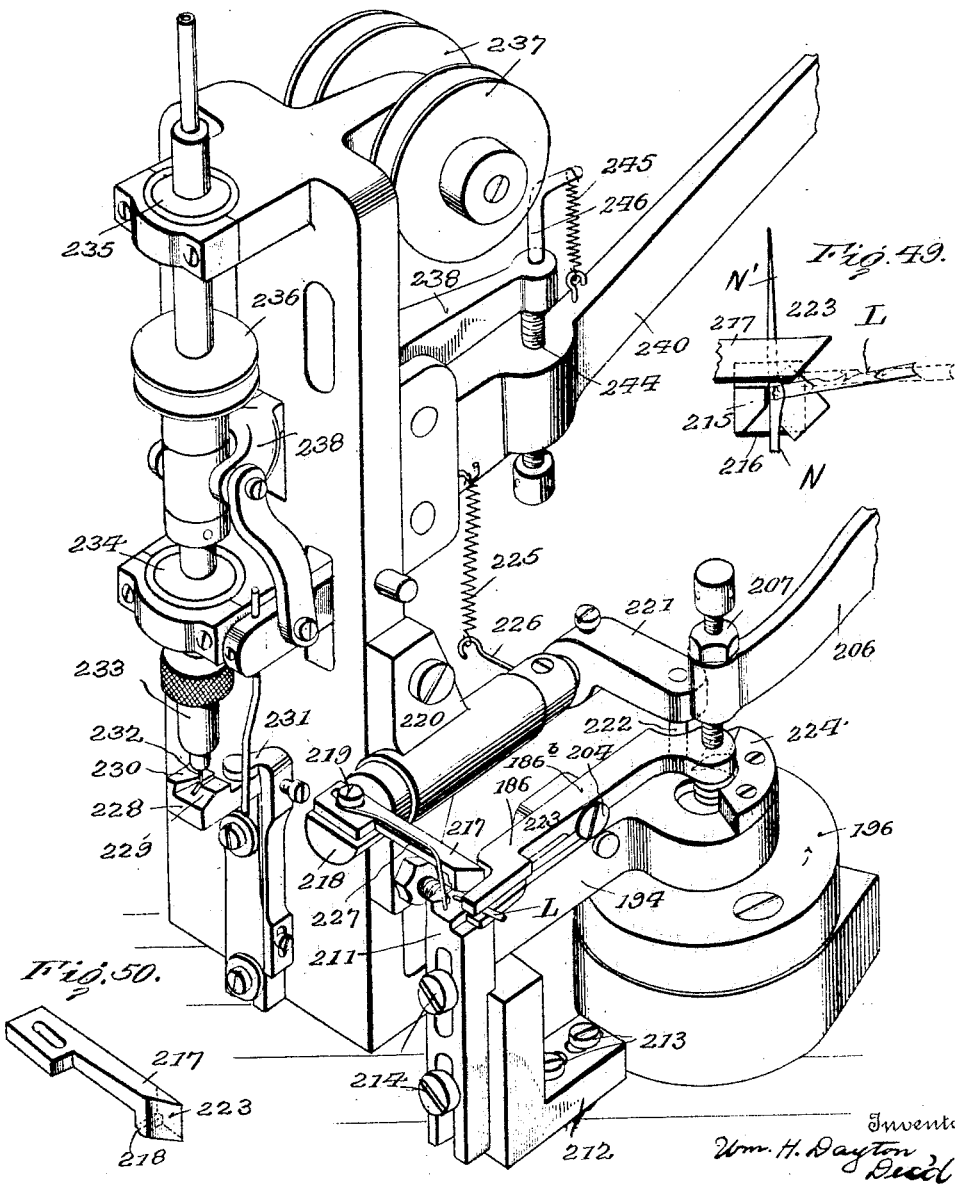

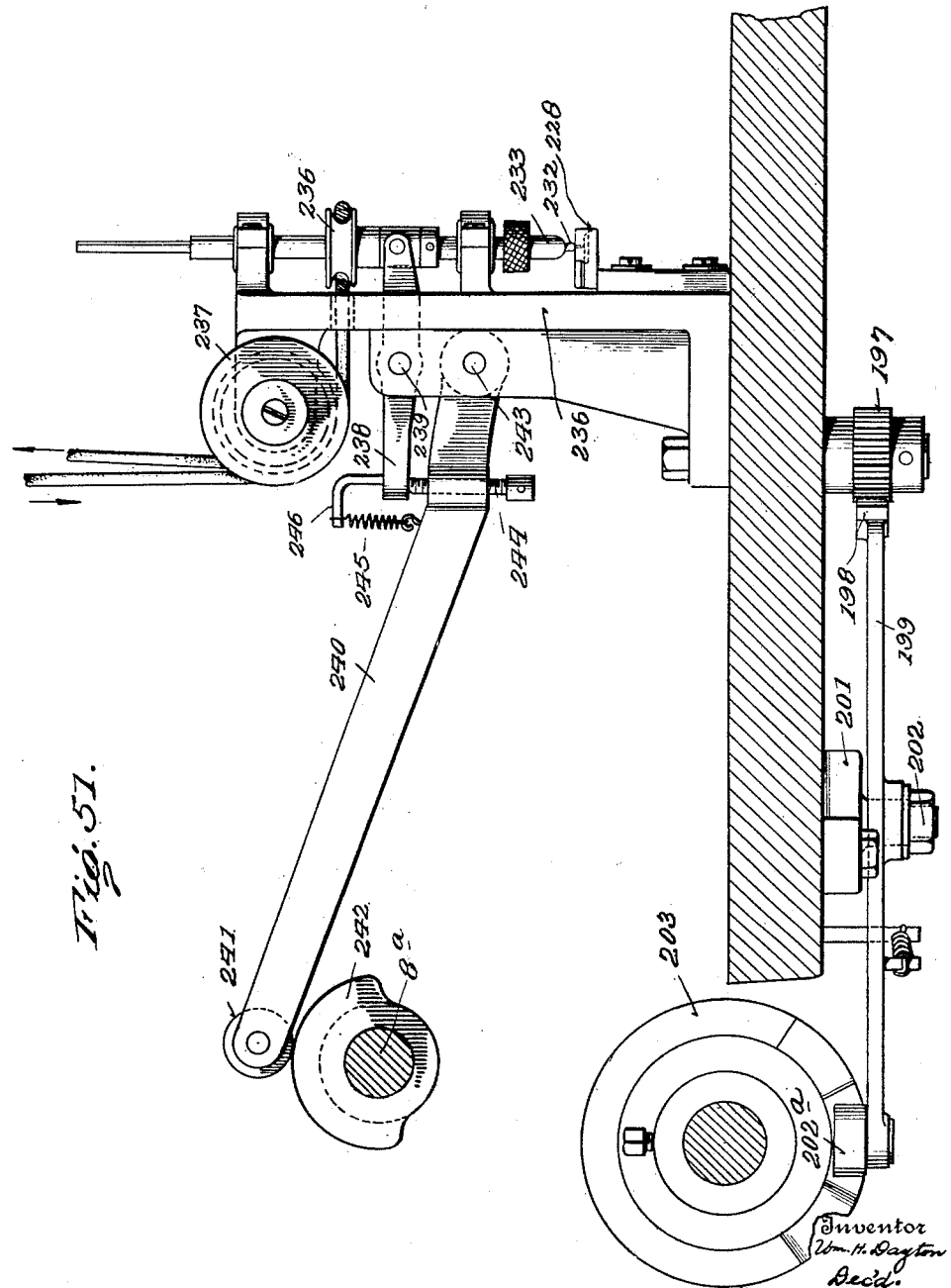

W. H. DAYTON, DEC'D.
J. M. DAYTON, ADMINISTRATOR.
LATCH NEEDLE MAKING MACHINE.
APPLICATION FILED NOV. 19, 1918.

1,381,810. Patented June 14, 1921.
34 SHEETS—SHEET 22.

Inventor
Wm. H. Dayton.
Dec'd.
James M. Dayton
Adm'r
By Sturtevant & Mason
Attorneys

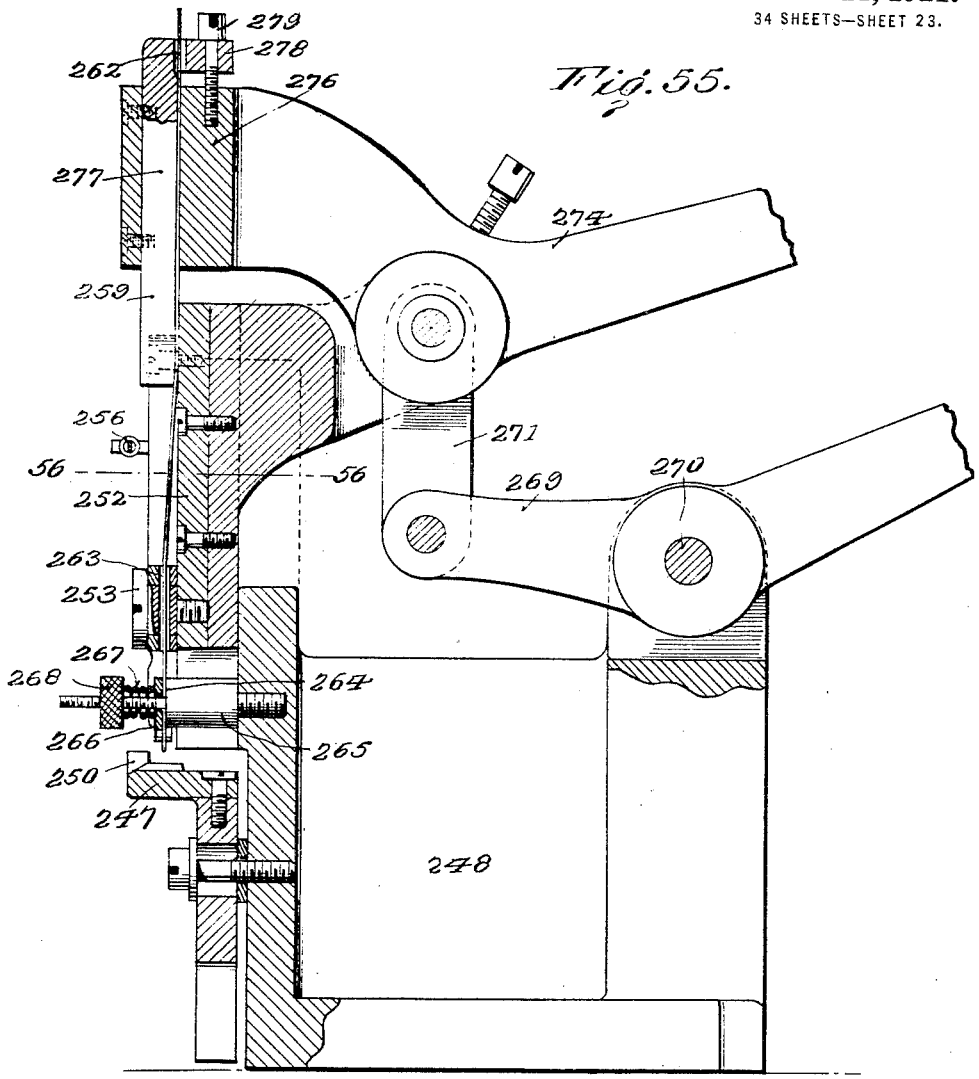
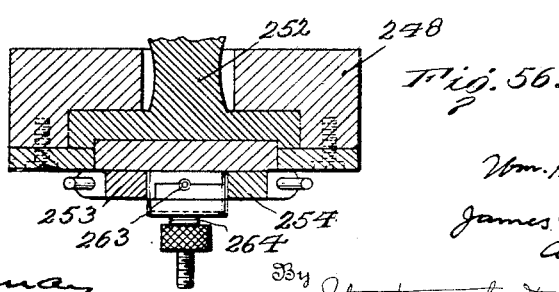

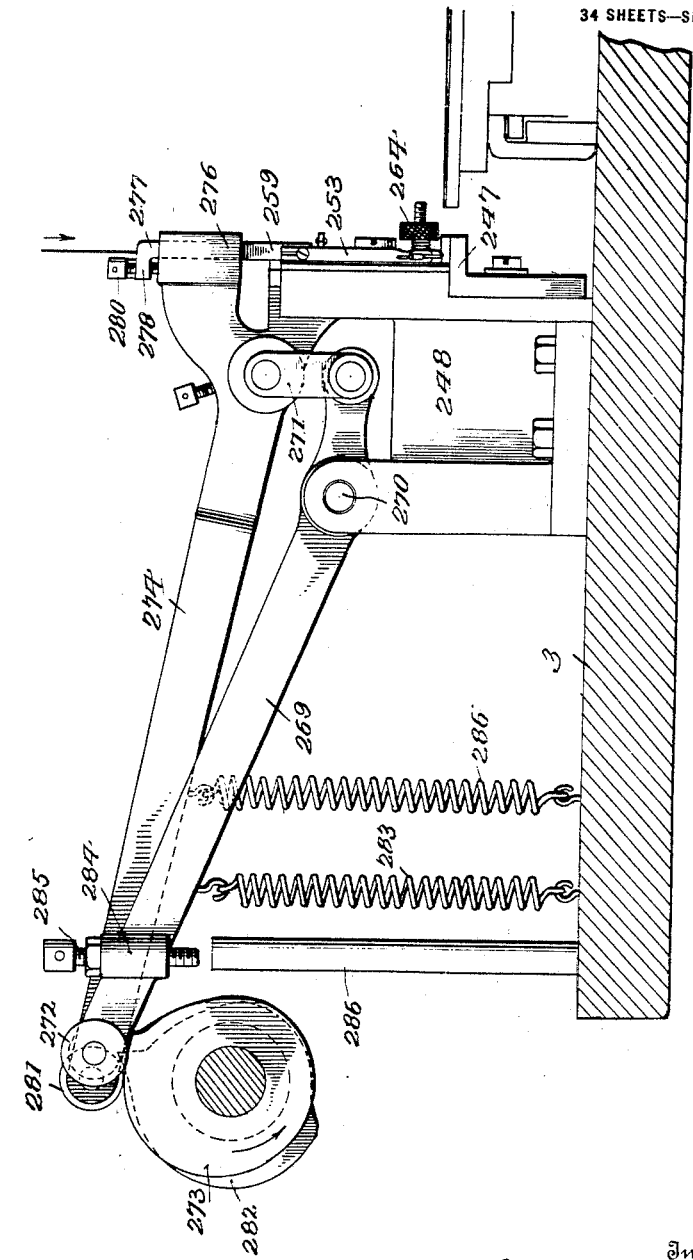

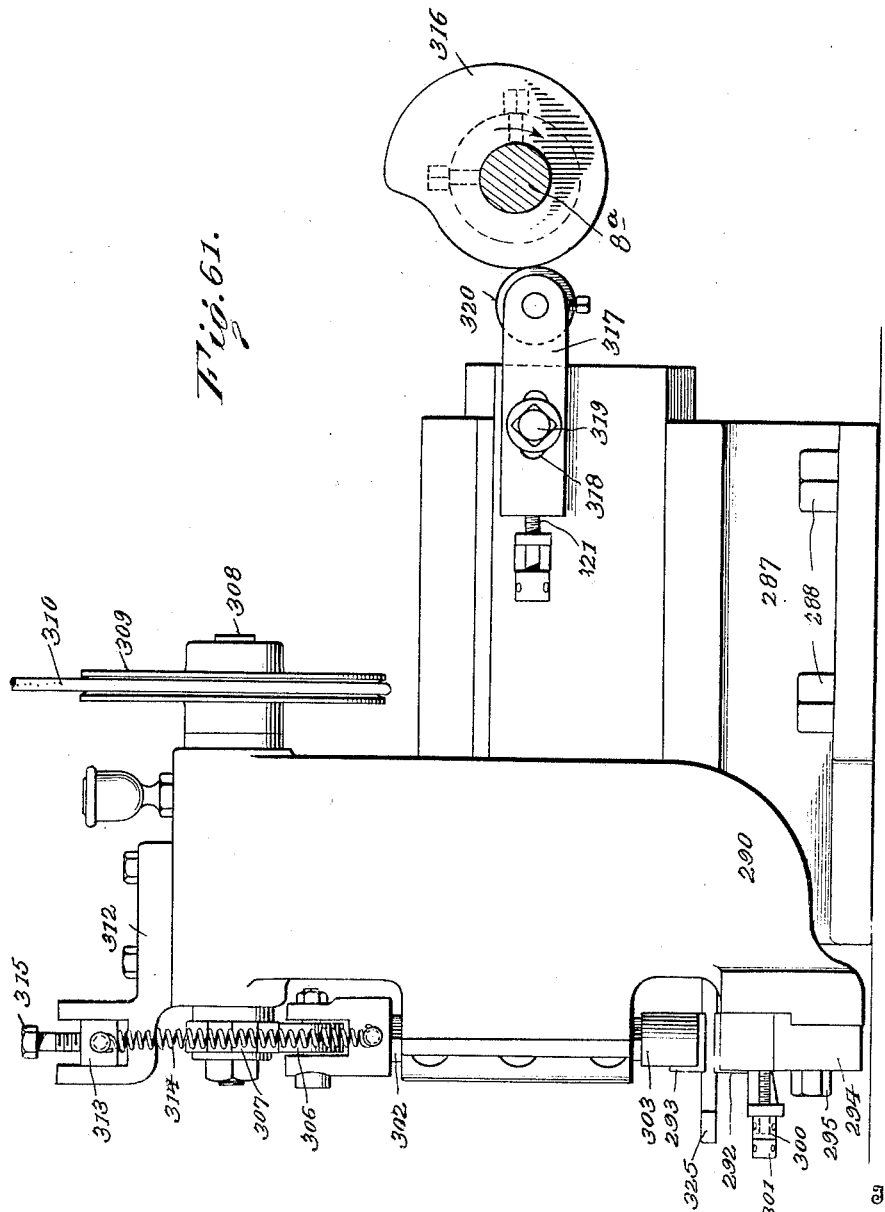

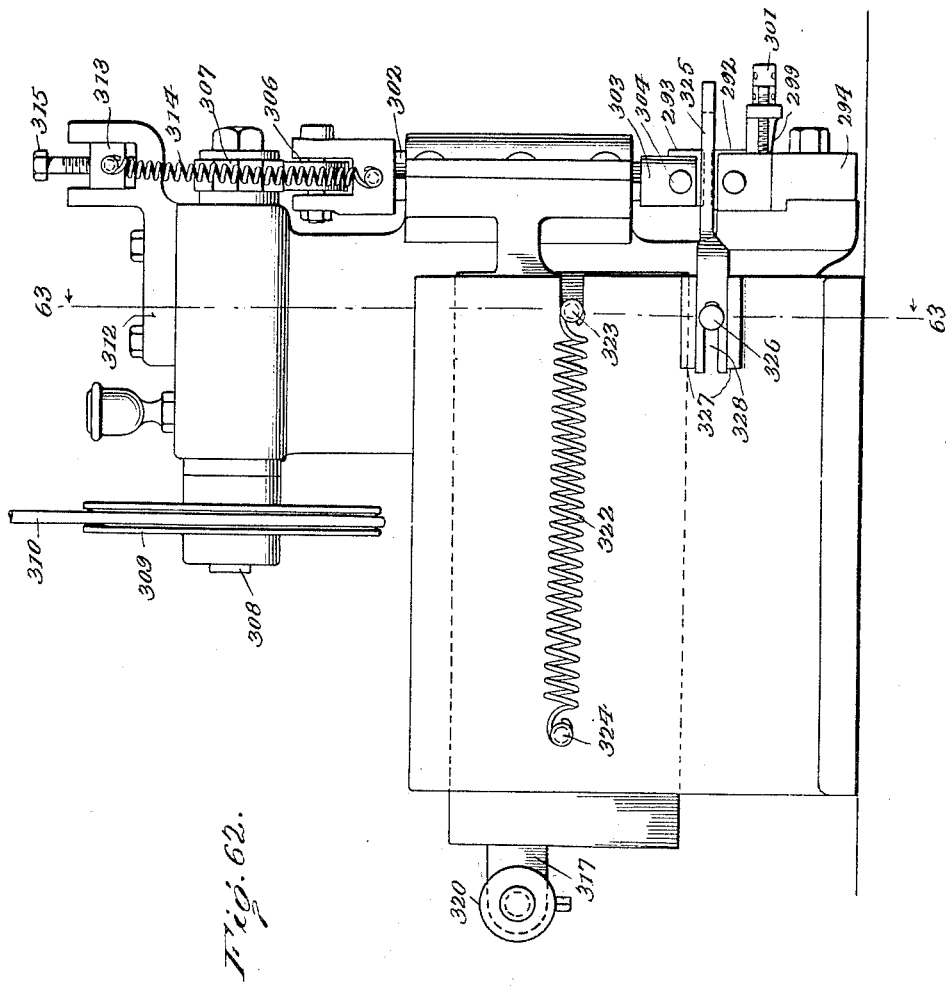

W. H. DAYTON, DEC'D.
J. M. DAYTON, ADMINISTRATOR.
LATCH NEEDLE MAKING MACHINE.
APPLICATION FILED NOV. 19, 1918.

1,381,810. Patented June 14, 1921.
34 SHEETS—SHEET 27.

W. H. DAYTON, DEC'D.
J. M. DAYTON, ADMINISTRATOR.
LATCH NEEDLE MAKING MACHINE.
APPLICATION FILED NOV. 19, 1918.
1,381,810.
Patented June 14, 1921.
34 SHEETS—SHEET 28.
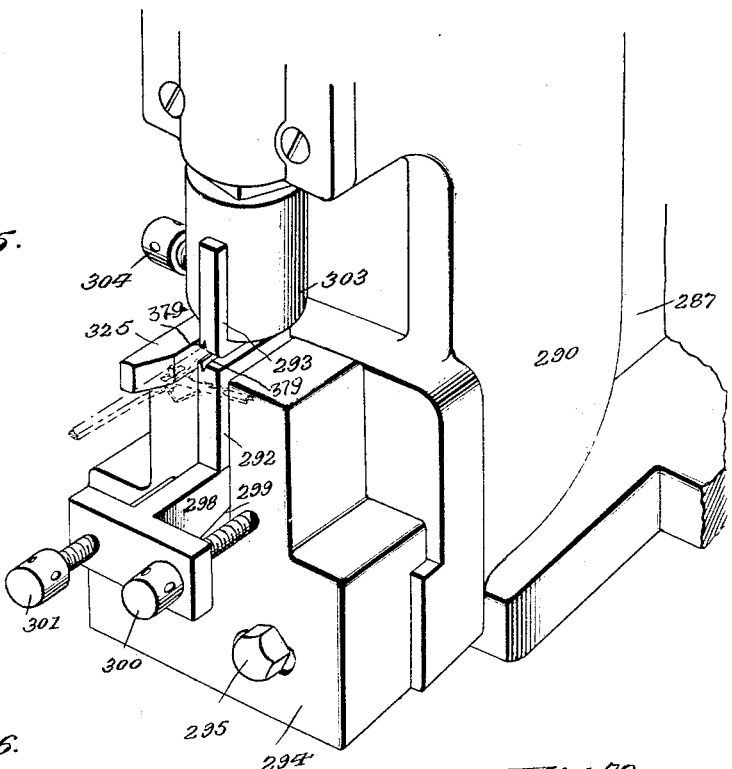
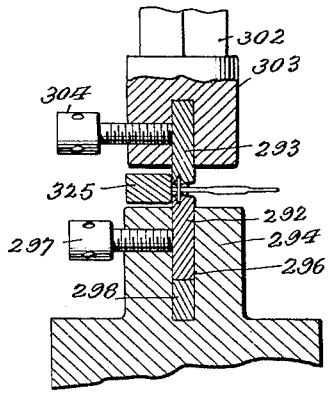
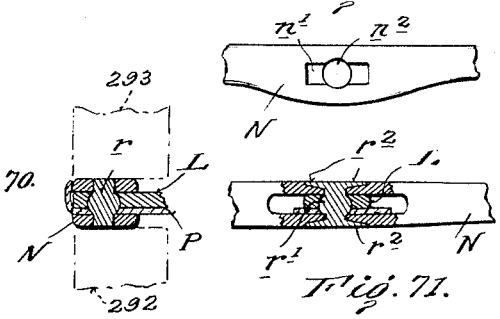
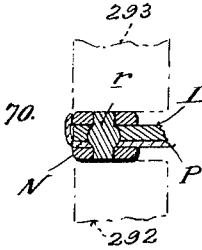
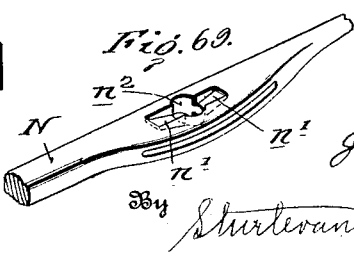

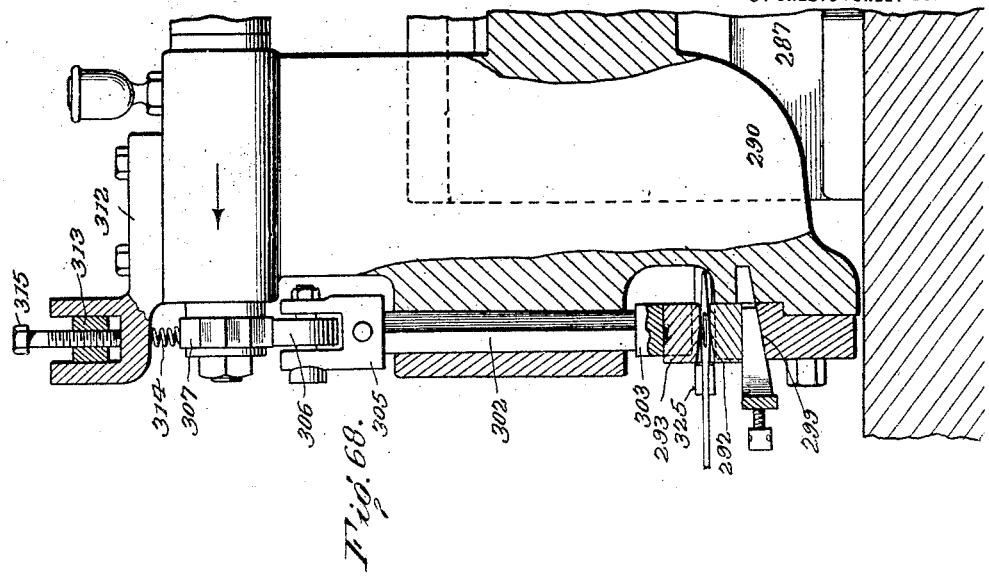
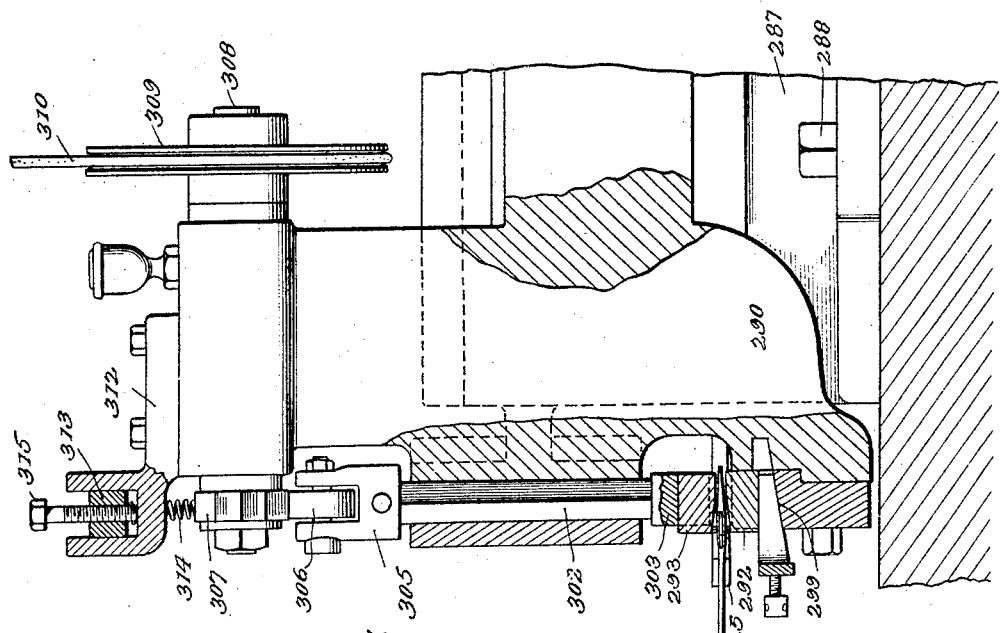

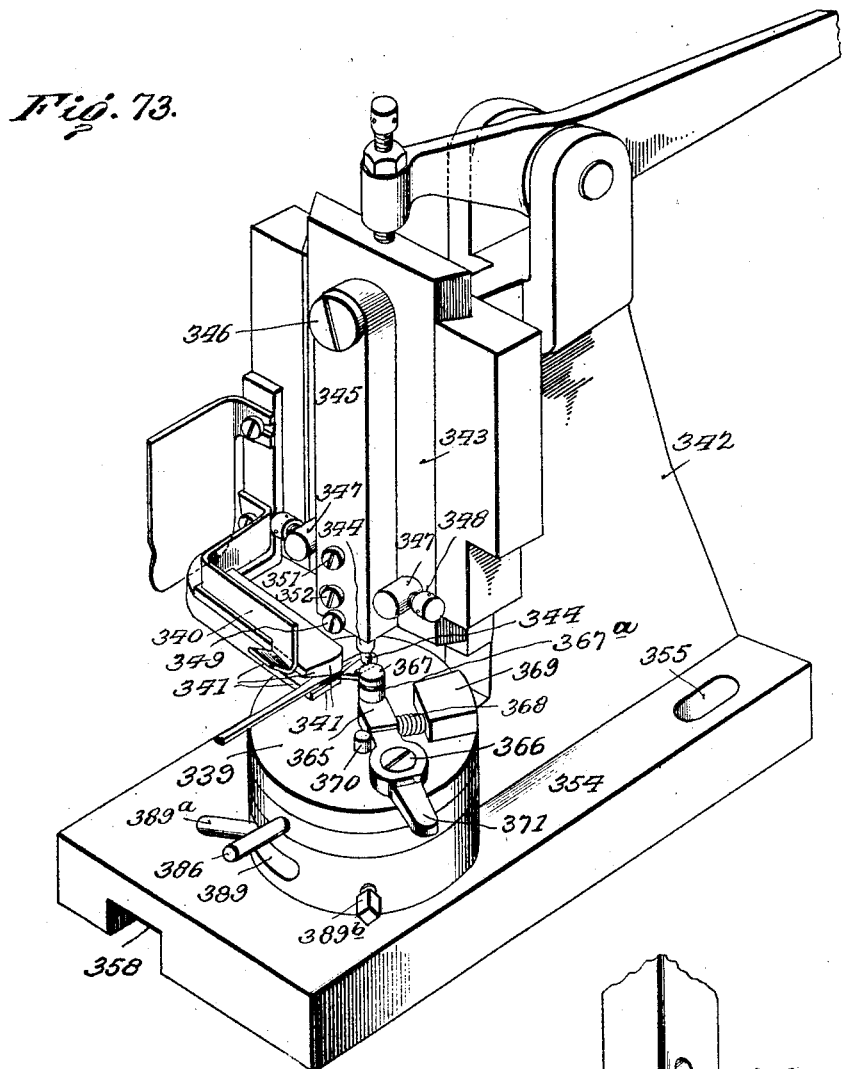
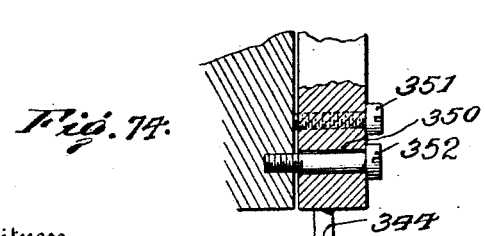
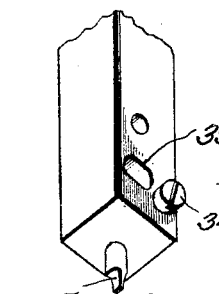

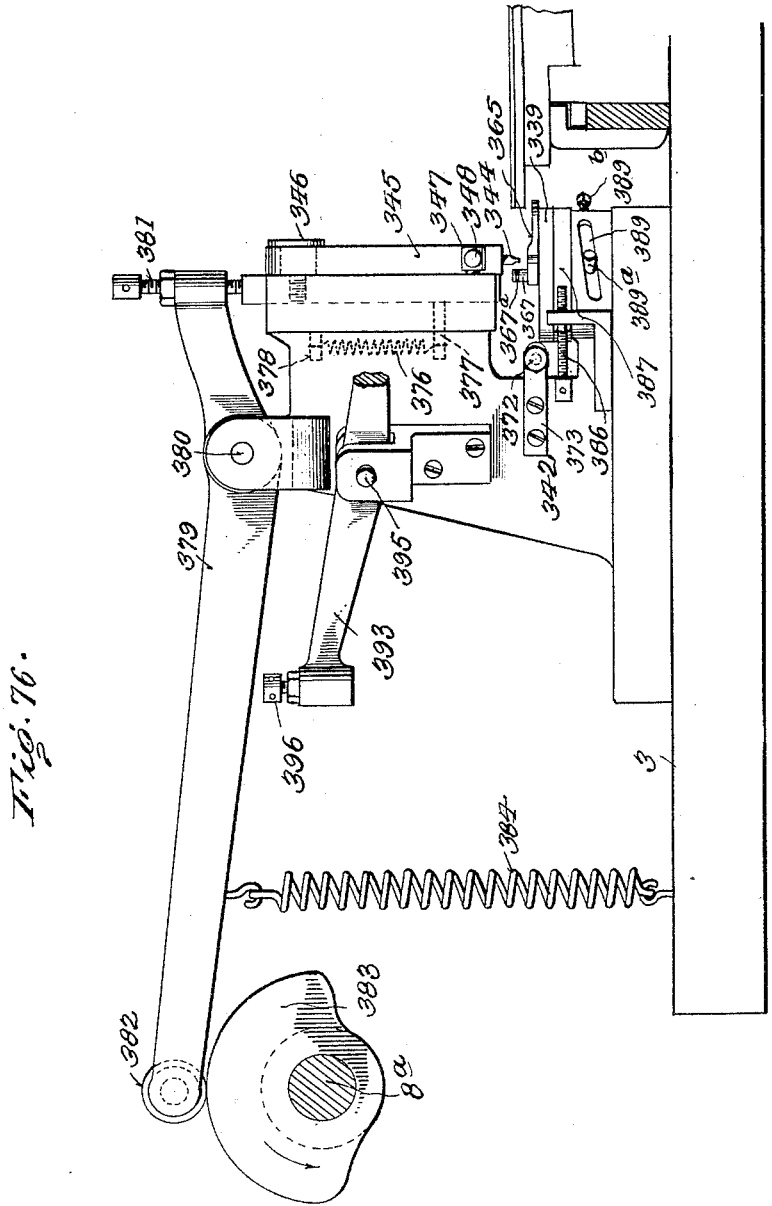

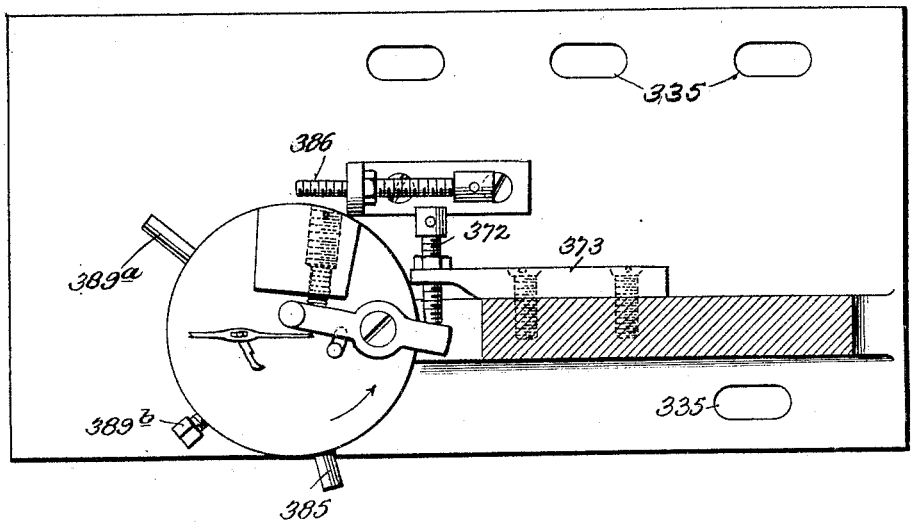
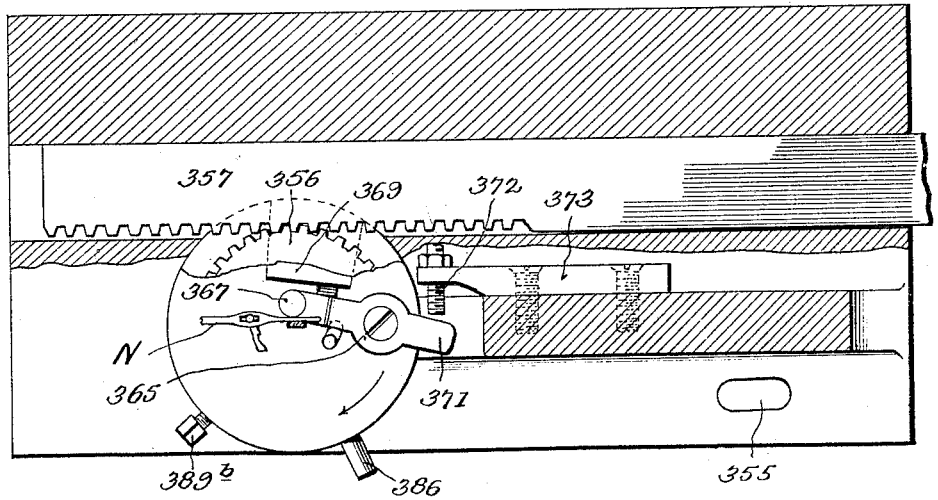

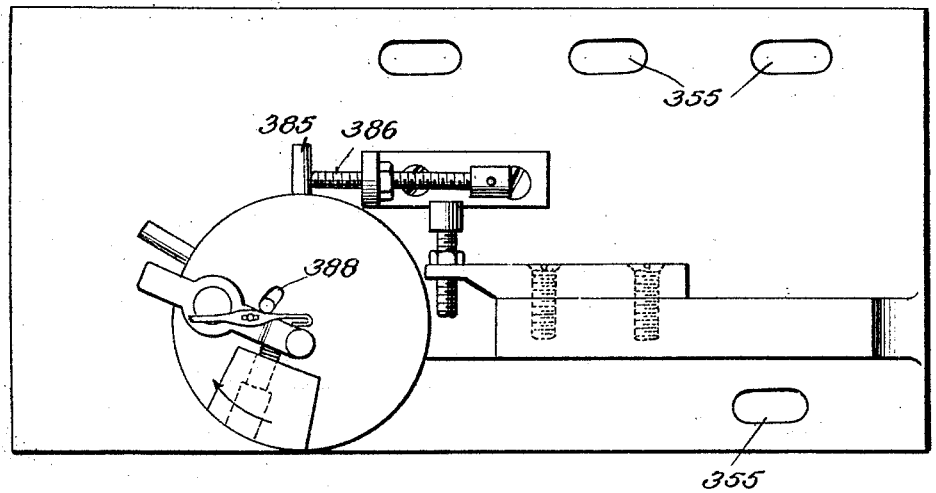
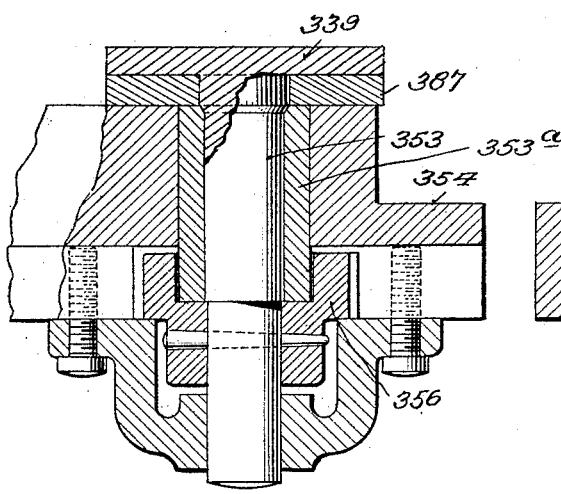
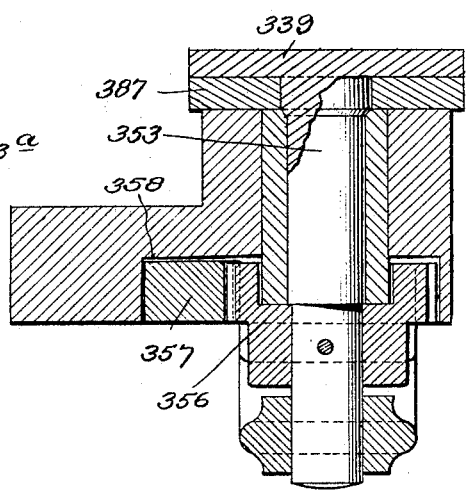

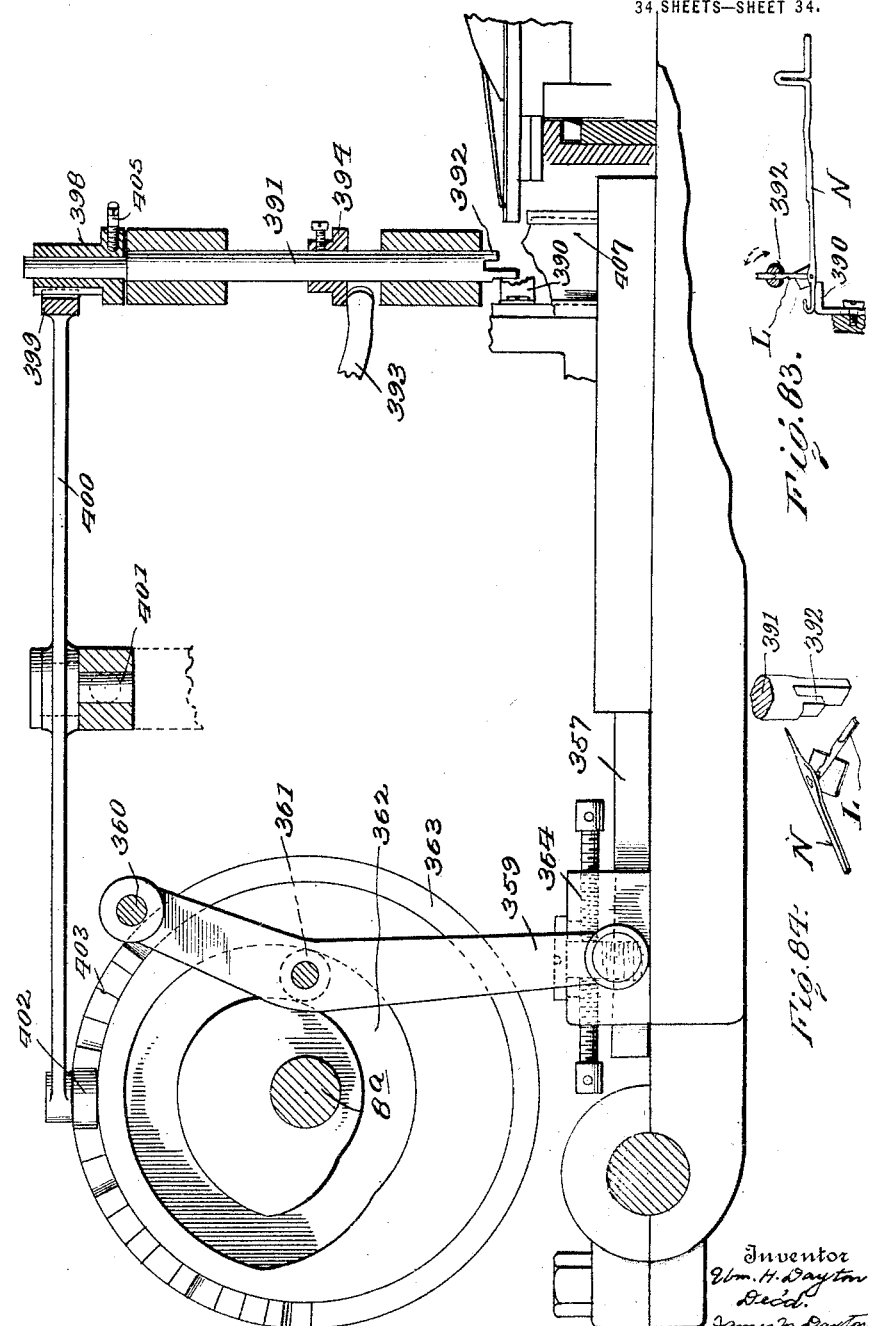

UNITED STATES PATENT OFFICE.

WILLIAM H. DAYTON, DECEASED, LATE OF TORRINGTON, CONNECTICUT, BY JAMES M. DAYTON, ADMINISTRATOR, ASSIGNOR TO THE TORRINGTON COMPANY, OF TORRINGTON, CONNECTICUT, A CORPORATION OF CONNECTICUT.

LATCH-NEEDLE-MAKING MACHINE.

1,381,810.  Specification of Letters Patent. Patented June 14, 1921.

Application filed November 19, 1918. Serial No. 263,208.

*To all whom it may concern:*

Be it known that WILLIAM H. DAYTON, deceased, having been a citizen of the United States, and a resident of Torrington, Litchfield county, Connecticut, did invent certain new and useful Improvements in Latch-Needle-Making Machines, of which the following is a description, reference being had to the accompanying drawings and to the figures of reference thereon.

The invention relates to new and useful improvements in machines for making knitting-needles, and more particularly a knitting needle having a swinging latch for closing the hook of the needle.

An object of the invention is to provide a machine wherein the latch is formed automatically from stock material and is automatically inserted in the needle slot and secured therein.

Another object of the invention is to provide a machine of the above type, wherein a non-metallic shim is formed and inserted in the needle slot prior to or with the latch to facilitate the handling of the parts and to insure sufficient clearance after the latch is riveted in place to permit said latch to swing freely on the needle.

A further object of the invention is to provide a latch carrier for transferring the latch from its finishing station to and inserting the same in the needle slot, together with coöperating guiding means to insure the proper positioning of the latch in the slot for riveting.

A still further object of the invention is to provide means for reaming the holes in the cheeks of the needle slots preparatory to the inserting of the rivet.

A still further object of the invention is to provide a machine of the above type with means for placing the rivets and subsequently severing the same from the stock material from which it is formed.

Still another object of the invention is to provide a riveting mechanism which is so arranged as to impart a series of light blows to the rivet for insuring the forming of a ball for a bearing for the latch and for supporting the cheeks of the needle prior to the heading of the rivet.

Still another object of the invention is to provide a riveting mechanism which is constructed so as to operate progressively on the rivet and to center the rivet in the needle before heading the same.

Still another object of the invention is to provide a machine of the above type, wherein the latch is attached to the needle prior to the forming of the hook of the needle and with means for bending the end of the needle to form the hook.

Still another object of the invention is to provide means for breaking the waste stub end from the latch after it has been secured to the needle.

These and other objects will in part be obvious and will in part be hereinafter more fully disclosed.

In the drawings which show by way of illustration one embodiment of the invention—

Figure 1 is a front view of a machine embodying the invention;

Fig. 1ª is a perspective view of a finished needle such as is formed in the present machine;

Fig. 2 is a plan view of the machine;

Fig. 3 is a view in end elevation of a part of the machine, at the discharge end thereof;

Figure 52:
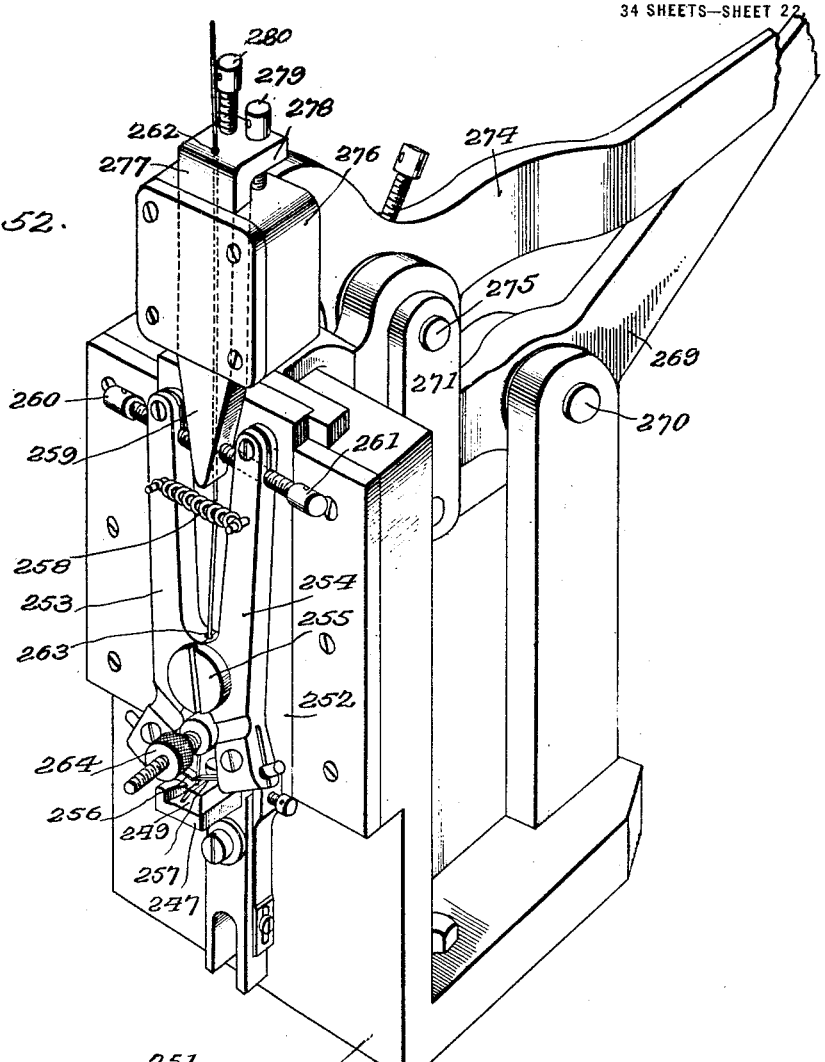

Fig. 3ª is a diagrammatic view showing the carrier, the needle chucks and the various stations and operations performed at each station;

Fig. 4 is a view partly in top plan elevation and partly in horizontal section of the discharge end of the machine;

Fig. 5 is a sectional view on the line 5—5 of Fig. 4;

Fig. 6 is a perspective view of one link or portion of the carrier and the needle chuck or holder carried thereon;

Fig. 7 is a plan view of the same, the clamping lever being in section;

Fig. 8 is a sectional view on the line 8—8 of Fig. 7;

Fig. 9 is a sectional view on the line 9—9 of Fig. 7;

Fig. 10 is a sectional view on the line 10—10 of Fig. 7;

Fig. 11 is a transverse sectional view through the supporting bed of the machine, the carrier, the track for the carrier, the controlling bar for the chucks and shows in side elevation a portion of the means for operating the controlling bar;

Fig. 12 is a perspective view of the track for the carrier;

Fig. 13 is a perspective view of the controlling bar for the chucks.

Figure 53:
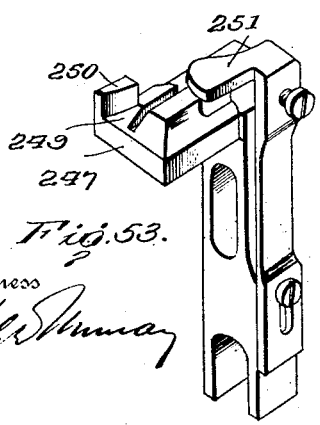
Figure 54:
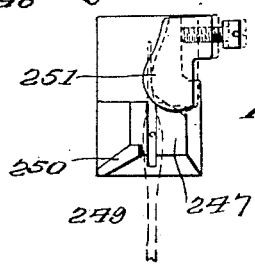
Figure 64:
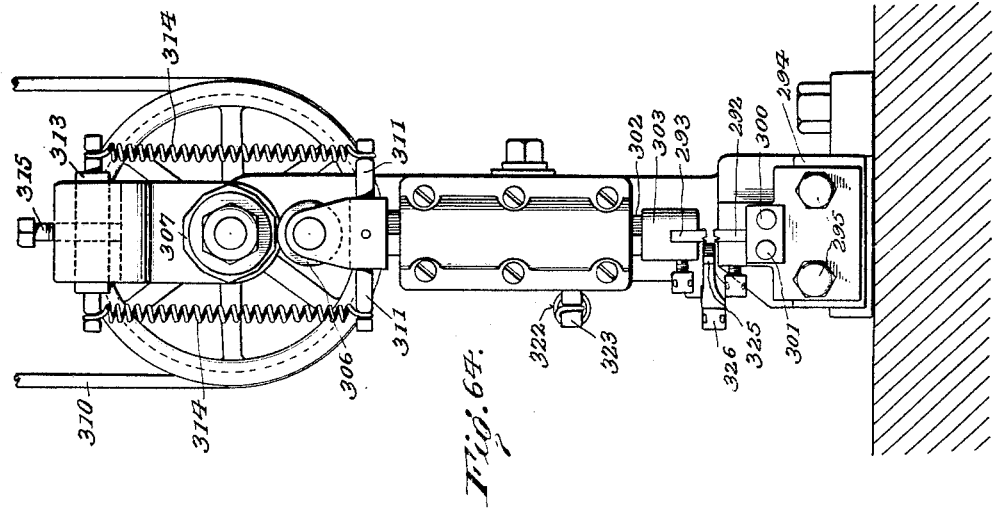
Figure 63:
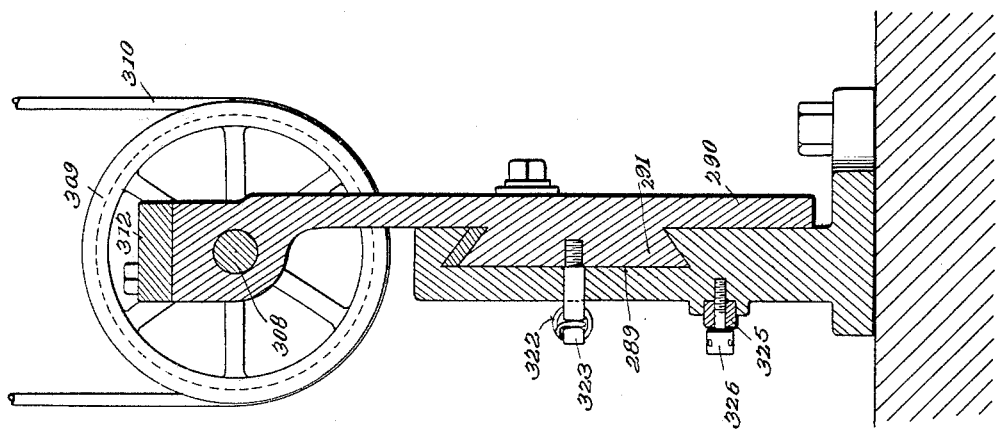

Fig. 14 is a perspective view of the essential parts of the paper shim forming mechanism, also showing the means for supporting and guiding the needle while the shim is being inserted in the needle slot;

Fig. 15 is an enlarged longitudinal sectional view through the paper feeding and cutting means, also showing means for supporting and guiding the needle;

Fig. 16 is a plan view of the parts shown in Fig. 15;

Fig. 17 is an enlarged view showing in plan the needle guiding and supporting means and the means for feeding the paper shim and turning the end of the paper after it is inserted in the needle slot;

Fig. 18 is a sectional view on the line 18—18 of Fig. 15;

Fig. 19 is a perspective view showing the needle with the paper shim inserted in the slot and the corner of the paper turned or crimped to hold the same in the slot;

Fig. 20 is a side view of the cam for operating the cutter for severing the paper strip;

Fig. 20$^a$ is a top view of a cam for operating the paper feed;

Fig. 20$^b$ is a side view of the same;

Fig. 21 is a view partly in section and partly in side elevation showing the means for forming the latch from stock material;

Fig. 22 is a view partly in section and partly in side elevation from the opposite side of the mechanism shown in Fig. 21;

Fig. 23 is a plan view of the mechanism for forming the latch from stock material;

Fig. 24 is an enlarged view partly in side elevation and partly in section, showing the devices which form the sides of the latch which punch the latch and which cuts the latch from the stock;

Fig. 25 is a sectional view on the line 25—25 of Fig. 24;

Fig. 26 is an enlarged sectional view through the die mechanism which forms the notch and the spoon shaped recess in the latch and showing the manner of swinging the same for feeding the stock;

Fig. 27 is a perspective view of the holder or guide coöperating with the movable die forming the notch in the spoon shaped recess in the latch;

Fig. 28 is a perspective view of the movable die coöperating with this holder;

Fig. 29 is a view showing more or less diagrammatically and in plan the several operating devices which form the latch from the stock material;

Fig. 30 is a similar view but showing the parts in perspective;

Fig. 31 is an edge view showing the latch finished except for the severing of the same from the stock material;

Fig. 32 is a side view of the same;

Fig. 33 is a sectional view on the line 33—33 of Fig. 32;

Fig. 34 is a plan view of the cam and a section of the supporting shaft therefor for operating the die which forms the notch and the recess in the latch;

Fig. 35 is a side view of the same;

Fig. 36 is a side view of the cam for pressing the stock to form the side faces of the latch;

Fig. 37 is a side view of the cam for operating the punch and trimming devices for punching the latch and severing the same from the stock;

Fig. 38 is a plan view of the cam and a section of the supporting shaft for feeding the stock and presenting the latch to the several operating devices;

Fig. 39 is a side view of the same;

Fig. 40 is a view in vertical section showing the swinging jaws which transfer the finished latch from the station where the same is formed to the station where the latch is inserted in the needle;

Fig. 41 is an enlarged perspective view showing the ends of the latch supporting jaws and the support for the needle at the inserting station;

Fig. 42 is a view in plan showing the means for releasing the transferring jaws from the latch;

Fig. 43 is a plan view of the operating mechanism for swinging the jaws, said jaws being positioned to receive the latch;

Fig. 44 is a similar view but showing the jaws positioned at the inserting station;

Fig. 45 is a side view of the cam for swinging the latch jaws;

Fig. 46 is an edge view of the same also showing a portion of the shaft on which it is carried;

Fig. 47 is a side view of the cam for opening the latch jaws;

Fig. 48 is a perspective view showing the station at which the latch is inserted in the needle and also showing the station at which the holes in the cheeks of the needles are reamed after the latch has been inserted in the needle or the station at which the cheeks forming the needle slot may be drilled;

Fig. 49 is an enlarged plan view showing the needle support and the guide for insuring the proper position of the latch in the needle slot;

Fig. 50 is a perspective view of said guide;

Fig. 51 is a view partly in section and partly in side elevation showing the operating means for the reaming device and also showing the devices for swinging the jaws;

Fig. 52 is a perspective view of the means for feeding the wire stock to form the rivet for cutting the wire and for supporting the needle at the time the rivet is inserted therein;

Fig. 53 is a perspective view of the supporting or guiding means for the needle for insuring the proper register of the openings therein with the wire which forms the rivet;

Fig. 54 is a plan view of the same;

Fig. 55 is a vertical sectional view through the wire feeding and cutting means for forming the rivet;

Fig. 56 is a sectional view on the line 56—56 of Fig. 55;

Fig. 57 is a side view showing the means for bodily shifting the head for feeding the wire and also the means for operating the cutting devices for the wire to form the rivet;

Fig. 58 is an edge view of the cut-off cam for cutting the wire to form the rivet— also showing a section of the shaft supporting the same;

Fig. 59 is a side view of the same;

Fig. 60 is a side view of the cam for moving the head to feed the wire;

Fig. 61 is a view in side elevation showing the riveting mechanism;

Fig. 62 is a similar view of the opposite side of the riveting mechanism;

Fig. 63 is a sectional view on the line 63—63 of Fig. 62;

Fig. 64 is a front view of the riveting mechanism;

Fig. 65 is a perspective view of a portion of the riveting mechanism;

Fig. 66 is a transverse vertical sectional view through the dies of the riveting mechanism and the portions adjacent thereto;

Fig. 67 is a view partly in vertical section and partly in side elevation, showing the position of the needle at the beginning of the riveting operation;

Fig. 68 is a similar view but showing the position of the riveting mechanism at the finishing of the riveting operation;

Fig. 69 is a perspective view of a needle having a recess formed for the oblong head of the rivet;

Fig. 70 is a transverse sectional view through the needle showing the latch riveted in place;

Fig. 71 is a longitudinal sectional view through the needle with the latch riveted in place;

Fig. 72 is a plan view of the needle before the latch and rivet are inserted therein;

Fig. 73 is a view in perspective showing the mechanism for forming the hook on the needle after the latch has been inserted therein;

Fig. 74 is a detail in vertical section showing the means for supporting the post around which the hook is formed;

Fig. 75 is a perspective view of the same;

Fig. 76 is a side view of the hook forming mechanism located above the bed;

Fig. 77 is a top plan view showing the rotating turret for forming the hook on the needle;

Fig. 78 is a view partly in top plan view and partly in section, showing the operating means for the turret which forms the hook;

Fig. 79 is a view showing more or less diagrammatically the position of the turret when the hook is finished;

Fig. 80 is a vertical sectional view through the operating and supporting means for the turret;

Fig. 81 is a view similar to Fig. 80, but at right angles thereto;

Fig. 82 is a view partly in section and partly in side elevation showing the means for breaking the waste stub end from the latch after it has been attached to the needle;

Fig. 83 is a view showing diagrammatically the support for the needle and the stub end waste breaking means in engagement with the latch;

Fig. 84 is a detail in perspective showing the position of the stub end breaker as the needle is brought into coöperative relation thereto.

The machine embodying the invention includes broadly a suitable supporting frame having a bed over which an endless carrier travels, which carrier is provided with a series of chucks or needle holders, each of which is adapted to clamp and support a needle which has been previously formed with the exception of the applying of the latch and the forming of the hook of the needle. This carrier is operated intermittently, so that the needle chucks present the needles carried thereby first to one operating station and then another until the latch has been attached thereto and the hook end formed on the needle, after which the needles are released from the chucks and discharged from the machine.

At the first active station at which the needle stops a non-metallic shim is formed and inserted between the cheeks forming the slot in the needle. This non-metallic shim is preferably made of paper, which is fed in strip form through suitable devices, so that a corner of the paper is inserted in the slot and the end thereof turned up or crimped, so as to hold the paper in place in the needle and this shim is cut from the strip of paper.

The needle with the shim of paper in the slot is conveyed to a station by the forward movement of the carrier where the latch is inserted. The latch is formed from stock by suitable devices which press the sides of the metal blank to form the side faces of the latch, notches the latch to assist in the breaking off of the waste stub shank at another station in the machine, recesses the face of the latch, punches the same and cuts the latch from the stock. Before the latch is cut from the stock, it is inserted in transferring jaws which swing, so as to carry the latch to the inserting station and which also operate to place the latch in the needle. The shim of paper frictionally holds the latch in place, so that the needle with the latch inserted is then by another step movement of the carrier conveyed to the station where a reamer is inserted in the holes formed in the cheeks of the needle and this reamer extends, of course, through the punched hole in the latch. The reamer alines the holes and clears the same for the inserting of the rivet. It is obvious, of course, that the holes in the cheek may be drilled at this time instead of reamed, if desired.

The needle is then conveyed by the next step movement of the carrier to a station where a rivet is inserted in the holes in the needle and the latch and cut to the proper length. Then the needle is carried by the next step movement of the carrier to the riveting dies which operate first to position the rivet in the needle and then by a series of light blows to ball the center of the rivet where the latch is attached and to head the rivet forming oblong heads thereon. This completes the attachment of the latch to the needle and the needle is then conveyed by the next step movement of the carrier to a station where the hook is formed on the needle. After the formation of the hook the needle passes to the next station where the waste stub end of the latch is broken off and this completes the operations of the machine. The conveyer then carries the chuck underneath the releasing device which releases the needle clamp and the needle drops into the receiving pan.

The construction and operation of the machine will be made clear by reference in detail to the accompanying drawings, in which the general structure and arrangement of parts will be first described, after which the various operating mechanisms will be described in detail.

*General structure and arrangement of parts.*

The machine includes a supporting frame 1, carried by suitable legs 2 and mounted on this supporting frame is a bed plate 3. At the receiving end of the machine is a main operating shaft which is rotated by a belt wheel 4 and associated with this belt wheel is a suitable clutch mechanism, indicated at 5. This main shaft carries a worm gear 6 which meshes with a gear 7 on a shaft 8, running lengthwise of the machine and carrying the main portion of the operating devices.

An endless carrier, indicated at A in the drawings, is provided with a series of needle chucks or clamps, and this carrier is driven intermittently for presenting the needles first to one station and then another. The first active station at which the needle is presented is indicated at B in the drawings, and at this station a shim of paper is formed and inserted in the slot in the needle, which is to receive the formed latch. The latch forming devices are indicated at C in the drawings. These latch forming devices operate to notch the stock material from which the latch is made, recess the face of the latch, form the side faces of the latch and punch same and cut the finished latch from the stock. The inserting station where the latch is placed in the slot of the needle is indicated at D in the drawings. The reaming station, for reaming or drilling the needle, is indicated at E in the drawings. The rivet forming and inserting station is indicated at F in the drawings. The riveting mechanism for heading the rivets by imparting a series of light blows thereto is indicated at G in the drawings. The hook forming mechanism for forming the hook on the end of the needle after the latch has been riveted thereto, is indicated at I in the drawings. The breaking mechanism for breaking off the waste stub shank is indicated at J in the drawings. These various mechanisms will now be described in detail.

*Endless carrier and needle chucks.*

The endless carrier and needle chucks are shown more particularly in Figs. 4 to 13, inclusive, of the drawings.

Mounted on the bed plate 3 is a track-way 9 having guiding ledges 10—10. Mounted to slide on this track-way is the endless carrier A. This endless carrier is formed with a series of links or portions 11, which are pivoted together by pivot pins or pintles 12, which are adapted to overlie the ledges 10—10 of the track-way. This endless carrier runs over a wheel 13, mounted in a frame at one end of the machine and adapted to turn freely therein and also a wheel 14 which is mounted in the other end of the frame. This wheel 14 is carried by a short shaft 15. The shaft 15 is journaled in a suitable bearing 16, carried by the frame. Mounted on this shaft 15 is a ratchet wheel 17. The ratchet wheel is fixed to the shaft and is for the purpose of giving said shaft a step by step movement to cause the endless carrier to be progressed along the track-way. Coöperating with the ratchet wheel 17 is a pawl 18, which is pivotally mounted on a segment 19 freely carried on the shaft. This segment is formed with a segmental rack 20 which is adapted to be engaged by a segmental gear 21 on a lever 22, see Fig. 3. The lever 22 is pivoted at 23 and carries a roller 24, which is held by a spring 25, so as to be engaged by a cam 26 projecting from a disk 28 mounted on the shaft 8. The shaft 8 carries a gear wheel 30 which meshes with an idle gear wheel 31, which in turn meshes with a gear wheel 32 on an auxiliary shaft $8^a$, the purpose of which will be described later. As this shaft 8 rotates the lever 22 will be vibrated by the cam 26 and this will oscillate the pawl 18, which in turn will move the ratchet wheel 17 through a step movement and this will cause the endless carrier to be stepped along intermittently. The wheels 13 and 14, which support the endless carrier A, at the ends of the frame, are formed with flat sections adapted to coöperate with the flat faces of the links forming the endless carrier, so as to cause the endless carrier to move with said wheels. The endless carrier is held on the track-way by angle bars 33 and 34, see Fig. 11, which angle bars are bolted to the trackway.

Mounted on each link is a needle chuck 35, see Figs. 6 to 10, inclusive. The link 11 is formed with a dove-tail recess and the chuck 35 is dove-tailed in cross section so as to fit within this recess. This holds the chuck from lateral movement on the link, but permits said chuck to slide freely endwise or longitudinally in the link. Said chuck has a supporting plate 36, which is formed with a ledge 37, along which the needle, indicated at N in the drawings, is placed. The needles are completely formed except for the insertion of the latch and the bending of the hook end of the needle. In other words, each needle has a needle butt and this needle butt is used for positioning the needle on the chuck. The needle butt extends into a recess 37' in the plate 36. Mounted in the chuck is an adjustable stud 38, having a positioning pin 39, set eccentrically thereon. The outer face of the butt of the needle is adapted to bear against this pin. The stud 38 is held in adjusted position by a set-screw 40. By loosening the set-screw the stud may be shifted so as to vary the position of the eccentrically set pin 39. This is to permit a very nice setting of the needle, so that, as it is presented to the several stations, the slot and the holes in the cheeks forming the slot may be brought into the desired registration at each station. The needle shank is held against the pin 39 by a rocking lever 41. This lever is pivoted at 42 to the chuck and a spring 43 forces the end 44 of the lever against the shank and the shank in turn against the pin. Mounted on the lever is a spring finger 45, which overlies the needle at a point adjacent the inner end of the chuck. Said finger has a shoulder 46 which serves to hold the needle on the chuck and against the ledge 37. The chuck is formed with a stop-pin 47 adapted to engage an adjustable stop 48, which prevents the chucks from sliding off from the endless carrier when freed from the controlling bar for the chucks.

*Shifting mechanism for moving the chucks.*

As above noted, the endless carrier has an intermittent or step by step movement and at certain of the stations it is desirable to move the chucks endwise on the carrier so as to bring the needle into proper position for the various operations performed thereon. The chucks are controlled by a single controlling bar, which is indicated at 49 in the drawings. This controlling bar 49 is mounted to slide freely on brackets 50, bolted to the main frame. Secured to the underface of the controlling bar 49 is a bracket 51, which bracket is clamped to a rod 52 mounted to slide freely in supporting bearings 53—53, carried by the underface of the bed plate. There is also a second depending bracket 51' carried by a rod 52', which is similarly mounted in bearings carried by the underface of the bed plate. These rods are moved inwardly by means of springs 54. Each rod carries a roller 55 at its extreme inner end which is adapted to coöperate with a cam 56 on the shaft 8. As this shaft 8 rotates, the cam 56 engaging the roller 55 will force its respective rod 52 outwardly and this will cause an outward movement of the controlling bar 49 away from the endless carrier. As soon as the rollers 55 are released by their cams, then the springs 54 will move this controlling bar 49 inwardly. Projecting downwardly from each chuck 35 is a pin 57. The controlling bar has a ledge 58, see Figs. 4, 5 and 13, which extends along in back of the pins 57. This controlling bar has a front ledge 59, which is cut away at 60, at one end of the bar, and at 62 at the other end of the bar. Said ledge 59 is also formed with a slot or recess 63. Mounted on this controlling bar is an inclined plate 64.

As above noted, the chucks are moved intermittently along the controlling bar and at certain of the stations there are adjustable bolts 65, which are adapted to engage the outer end of the chuck when at said station. Mounted on the controlling bar between the stations are cam plates 66, which are adapted to engage the pins 57 on the chucks and insure the pin being shifted so that, as the carrier moves to bring the chuck to a station, the pin will not strike the bolt 65, but will pass to a position directly in rear of the same, as viewed by the operator, Associated with each adjustable bolt 65 is a yielding pin 67, carried by a spring 68. These pins engage the other face of the pin on the chuck so as to prevent lost motion and at the same time said pin 67 yields to permit the pin 57 to move to a position directly in line with the adjustable bolt 65. This controlling bar, as above noted, has a movement toward and from the carrier and, of course, is timed so as to move when the carrier is stationary. The result of this movement of the bar is to move the chucks inwardly to an extreme inward position where the chucks remain at a dwell for a certain time after which they are positively moved outwardly by the shifting of this controlling bar. The cams for shifting this controlling bar move the chucks outwardly and the springs operate to move the chucks inwardly, so that the chucks are for a greater part of the time at their extreme inward position, but move outwardly a sufficient time to permit the carrier to shift the chuck and bring the same to the next station. The recess 63 in the outer ledge 59 is for the purpose of preventing the inward movement of the chuck opposite the same when the other chucks move forward. This is to avoid any possible interference with the swinging of the latch to the point where it is inserted in the needle. The ledge 59 is cut away at the projecting end of the machine, so that when the chucks are moved to their extreme outer position they remain in this position until the carrier brings the chucks around to a point where the pins 57 on the chucks engage the inclined plates 64, which again brings the chuck into operative control by the bar 49. At the right-hand side of the machine, as viewed in Fig. 2, there is a supporting pan 69, in which the needles are placed in bulk. The operator takes a needle from the pan, presses on the lever 41, raising the same, and also the finger 45, placing the needle on the chuck with the shank of the needle in the recess 37 and against the pin 39, after which the lever 41 is released and it will automatically clamp the needle in place on the chuck. No further attention is required on the part of the operator, the carrier moving automatically presents the needles first to one station and then another and finally the needles are ejected from the machine. At the left-hand end of the machine, there is a bracket 70, see Figs. 2 and 4. Adjustably mounted on the bracket 70 is a plate 71 which is adapted to be engaged by the lever 41 and the plate is so disposed that the lever in passing over the same will be depressed so as to release the needle from the chuck. The needle as it is released, will strike a wire 72, at its hook end, and drop butt first into the pan 73, shown at the left-hand end of the machine, in Fig. 1. In order to insure that the chucks shall be retracted and held in such retracted position after they leave the controlling bar, I have provided a guide rail 74, see Fig. 2, which is adapted to engage the inner ends of the chucks.

*Paper shim forming and inserting mechanism.*

The paper shim and inserting mechanism for placing the shim of paper in the slot of the needle preparatory to the inserting of the latch therein is shown more particularly in Figs. 14 to 20, inclusive.

In Fig. 19, there is shown on a large scale a latch needle N, having its end N' extending longitudinally of the needle, but shaped so that later on it may be bent to form the hook of the needle. This needle has a slot $n$ extending through the needle. The cheeks $n'$ of the needle are preferably formed with openings $n^2$, which are adapted to receive the pivot for securing the latch in the slot in the needle. In these figures of the drawings, the paper shim is shown at $p$. The paper shim is inserted in the slot and the corner of the paper, indicated at $p'$ is crimped or folded up in order to hold the paper in place in the slot. The paper shim is formed and inserted in the slot by the following mechanism:

Mounted on the bed of the machine is a supporting bracket 75. Pivotally carried by this supporting bracket is a swinging lever 76 having a recess 77 formed therein, through which a strip of paper P is fed from a roll 78, see Fig. 1. The roll is supported in any suitable way on a bracket rod 79. The paper strip is led underneath a guide roll 80 and underneath a friction finger 81 and along the recess 77. When the needle is brought by the carrier to the station B, the chuck is moved forward by the controlling bar and the point of the needle N' passes along a guiding plate 82 and underneath a guiding lip 83. This guiding plate and the guiding lip are tapered so that, if the needle is slightly bent, it will be straightened and the slot in the needle brought into a predetermined position in register with a guide-way 84 carried by a plate 85, through which guide-way the paper shim is passed. The guiding plate 82, the lip 83 and the plate 85 are carried by a supporting post 86, mounted on the bed plate of the machine. The paper is fed along the guiding recess by a feed dog 87. This feed dog is carried by a feed lever 88, which is pivoted at 89 to a sliding feed bar 90. This sliding feed bar moves back and forth in the bracket 75 and is held in place by a cover plate 91. The bar 90 is reciprocated by a rock lever 92, which is pivoted at 93 and is operated by a link 94 connected in turn to a lever 95 carrying a roller 96 running in a cam groove 97 in a drum cam 98. The bar 90 has two spaced lugs 99, each of which is provided with an adjustable screw 100. The end of the rock lever 92 lies between these screws. As the drum cam 98 rotates it will through the train of mechanism described, move the bar 90 back and forth and thus impart a bodily movement to the feed lever 88 and the feed dog 87 carried thereby. By shifting the adjustable screws 100, the reciprocating position of this feed bar 90 may be varied. The lever 88 is moved downwardly at its outer end by a spring 101. The supporting lever 76, having the guiding recess for the paper, is also moved downwardly at its outer end, by a spring 102, and the downward movement of this lever is limited by an adjustable post 103. The two levers 76 and 88 are raised by a swinging lever 104, which is fulcrumed at 105 and carries a roll 106 coöperating with a cam 107. This cam 107 and the drum cam 98 are mounted on the shaft 8, above described. In the outer end of the lever 104 are two screws 108 and 109, which engage, respectively, the levers 76 and 88. Located in a suitable recess in the outer end of the lever 76, is a cutting blade 110. This cutting blade is adapted to coöperate with the plate 85, having the guideway 84 for the strip of paper in order to sever the strip of paper to form the paper shim, and after the shim has been inserted in the slot in the needle.

As above noted, the spring 101 holds the feed dog in engagement with the paper and while in engagement with the paper, the feed bar 90 moves forward to feed the paper strip. At this time, the lever 76 is in engagement with the post 103, so that the strip registers with the guideway 84 and will pass through the same into the slot in the needle. The extreme inner corner of the paper passing through the slot extends entirely through the needle and engages a bent wire finger 111, which crimps or turns up the corner of the paper so as to insure that it will remain in the slot. After the paper has been placed in the slot in the needle, then the cam 107, operating on the lever 104, will be depressed, the lever 76 causing the cutter 110 to sever the paper. At the same time the feed lever 88 is raised so as to lift the feed dog from contact with the paper and while the feeding dog is out of contact with the paper, the feed bar 90 is retracted ready for another forward movement to place the next shim in the next needle. After the shim has been placed in the needle the chuck is withdrawn by the outward movement of the controlling bar and the endless carrier then moves the chuck forward to the next station which happens to be an idle station. At the next forward movement of the endless carrier this needle with the shim of paper therein is brought to the station where the latch is inserted in the slot in the needle.

*Mechanism for forming the needle latch from stock material.*

The mechanism for forming the latches from stock material is shown more particularly in Figs. 21 to 39, inclusive. In Figs. 32 and 33 is shown the finished latch except for the severing of the same from the stock and the breaking of the waste stock from the latch which occurs after the latch has been secured to the needle. This latch is indicated at L in the drawings. The latch is formed with side faces $l$ and is punched, as indicated at $l'$. The latch is also formed with a recess $l^2$ which is adapted to receive the point of the needle when the needle is completed. In Fig. 1ª of the drawings, there is shown a completed needle N, having the latch L pivoted thereto by a rivet $r$. The hook of the needle is indicated at $N^2$ and it will be noted that, in dotted lines, the latch is swung so that the recess $l^2$ houses the point of the needle so as to insure that the yarn will pass over the hook.

Referring again to Figs. 32 and 33, it will be noted that the stock material, which is in the form of a wire, has a notch $l^3$ formed therein. This is for the purpose of assisting in the breaking off of the waste stub end after the latch has been attached to the needle.

The mechanism for forming this latch, and located at C in the drawings, will now be described.

The stock material is fed from a suitable supply and is in the form of a wire. The wire passes through a suitable tension device 112 and thence to tension rolls 113, see Fig. 23.

After leaving the tension rolls the wire passes along a die block 114, having a groove 115 formed therein, which receives and guides the wire. This block is clamped at the outer end of a swinging frame 116 by means of a clamping bolt 117, see Fig. 26. The block seats on a ledge 118 and rests in part against an adjustable screw 119. The die block is formed with a notch 120. Said die block has a similar groove 115' for the wire stock on the opposite face from the groove 115, and a notch 120', so that the die block is reversible. Coöperating with this die block is a notching die 121 and a die 122 for forming the recess in the latch. The die 121 is mounted on the die 122 and is held thereon by a screw 123. The opening in the die 121 for the screw 123 is of sufficient size to permit a slight endwise adjustment of the die 121. A wedge block 124 rests between the rear end of the die 121 and a shoulder on the block of the die 122. This forms a rigid abutment for the die 121, and at the same time permits that die to be adjusted relative to the die 122. These dies are reciprocated by suitable devices and operate to notch the wire and form a recess therein. The shank of the die 122 is mounted in a slide 125. Said slide is formed with a recess to receive the shank and in said recess is a threaded abutment 126 which may be adjusted for shifting the position of the die 122 to take up wear. The shank is clamped in place by means of a set-screw 127. The slide 125 is moved to the left, as viewed in Fig. 26, by a spring 128, and is moved to the right, as viewed in this figure, by a lever 129. The lever 129, see Fig. 23, is pivoted at 130 to the frame of the machine, and this lever carries a roller 131, coöperating with a cam 132 on the shaft 8. Said lever is provided with an adjustable screw 133, which is held in adjustable position by a set-nut 134. This screw is adapted to engage the rear end of the slide 125, so that when the lever is swung by the cam 132, it will force the slide forward and bring the dies 121 and 122 into engagement with the stock material in the die block 114, and thus form the notch and the recess, above described. The throw of the slide may be adjusted by varying position of the screw or bolt 133.

The wire after passing the dies referred to above, is led underneath a spring finger 135, which is carried by the swinging frame 116 and held in place therein by a set-screw 136. Said wire then passes over a vertical finger 137, carried by the swinging frame 116, and thence under a roller 138, also carried by this frame. After passing the roller 136, the wire is led across a die block 139. Said die block 139 is carried by a supporting block 140 and is held therein by a set-screw 141. Coöperating with this die block 139 is a reciprocating die block 142. The reciprocating die block 142 is mounted in a plunger 143, sliding in a head 144, carried by a bracket arm 145. A spring 146, bearing against a collar 147, on the upper end of the plunger 143, operates to hold the plunger raised and the die blocks 142 and 139 separated. These die blocks are for the purpose of forming the flat sides $l$ of the latch. The plunger 143 is depressed by a lever 148 which is pivoted to the bracket 145, and carries a roller 149, coöperating with a cam 150. This cam is shown in detail in Fig. 36 of the drawings. At the outer end of the lever 148, there is an adjustable screw 151, which bears against the upper end of the plunger. By adjusting this screw, the throw of the die block 142 may be varied. After passing the die blocks 139 and 142, the latch wire is led to the punching station where the hole in the latch for the rivet is formed. At this punching station there is a supporting die 152, on which the wire rests and a punch 153 which operates to punch the hole in the latch. The supporting die 152 is carried by a block 154. This block 154 lies between plates 155, formed in a part of the main support 156, which is secured to the bed plate of the machine. The supporting die is capable of slight lateral adjustment and is held in adjusted position by a set-screw 157. This supporting die has an opening for the punch 152. In order to guide the wire from which the latch is formed, a guide finger 158 is provided and this guide finger is secured to the head 144. The guide finger is intermediate the stations where the latch is punched and where the sides are formed. At the punching station is a guide 159, which is for the purpose of accurately positioning the latch wire, so that the hole will be properly formed therein. This guide has laterally projecting arms 160 and 161. The end of the guide is cam-shaped. The guide is held in place by a screw 162. By loosening this screw and tapping either the arms 161 or 162, the position of the guide may be shifted, so as to properly position the latch wire. The guiding arm 158 insures that the wire from which the latch is formed shall be held against the guide 159. As a means for holding the wire from which the latch is formed on the supporting die 152, and to insure the stripping of the wire from the punch, I have provided a stripper 163, which overlies the wire and is forked so that the punch passes down between the forked ends thereof. The punch 152 is carried by a reciprocating plunger 164. This reciprocating plunger slides in the head 144 and is raised by a spring 165, which bears against a head 166 at the upper end of the plunger 164. The plunger 164 is depressed by a lever 167, which is pivoted at 168 on the supporting bracket 145. This lever carries a roller 169, coöperating with a cam 170 on the shaft 8, said cam being shown in detail in Fig. 37 of the drawings. The lever 167 carries an adjustable screw 171, which bears against the head 166.

After the latch has been punched the wire forming the latch is then fed to the trimming station where the latch is severed from the stock. On its way to the trimming station it passes under a guiding finger 172 and thence under a combined guide and presser finger 173. The combined guide and presser finger 173 is pivoted at 174 to a supporting block 175. Mounted in this supporting block is a stationary trimming member or ledger blade 176. Coöperating with this stationary trimming member or ledger blade is a movable trimming member 177. The cutting face of the stationary member 176 is slightly rounded so as to form a rounded end on the latch. The movable trimming member 177 is formed with a similar shaped recess so that the cutting line of the cooperating trimming members is curved to accomplish the result stated. The stationary member 176 is carried by an adjustable support 178, which is held in position in the supporting block 175 by a set-screw 179. The movable trimming member 177 is carried by a slide 180, which reciprocates in the supporting head 144 at the end of the bracket 145. Said slide has a laterally projecting pin 181. At one side of the slide 180 there is a spring-pressed plunger 182, which presses upwardly against the pin 181 and this serves to raise the slide 180. The upward movement of the slide is limited by a stop-pin 183. The spring is indicated at 184 in Fig. 22 of the drawings. The slide is moved downwardly against the action of the spring by the lever 167 which operates the punch. Said lever extends forward over the slide and carries an adjustable screw 185, which is adapted to engage the upper end of the slide 180. The trimming members form the rear end of the latch—that is, the part adjacent the pivot.

Holding and transferring jaws are provided for carrying the latch from the forming mechanism to the station where it is inserted in the needle. These holding and transferring jaws are indicated at 186 in the drawings. The latch is severed from the stock material at a point some distance from the notch which leaves a sufficient waste stub end which may be grasped by suitable devices for bending the stock to break the same at the notch after the latch has been secured in the needle. The wire is progressed step by step through the various operating devices which form the latch and this is brought about by the swinging of the frame 116. Attention is called particularly to Fig. 23 of the drawings. The swinging frame 116 is carried by a pivot post 187, which pivot post is journaled in the bed plate in the machine, as indicated in Fig. 26 of the drawings. A spring 188 operates to swing the frame 116 in a counter-clockwise direction and an adjustable stop-screw 189 limits the movement. The frame is swung in the opposite direction against the action of the spring by a slide 190. This slide is adapted to engage an adjustable screw or an adjustable screw abutment 191, carried by the swinging frame 116. This slide 190 has a roller 191', see Fig. 21, adapted to coöperate with a cam 192 on the shaft 8 and a spring 193, indicated in dotted lines in this figure, forces the slide against the cam. The cam operates to swing the frame positively in a clockwise direction and this feeds the wire stock one step, while the spring 188 returns the swinging frame for the next forward step movement of the wire. The tension of the devices carried by the swinging frame 116 is such as to move the wire forward when the frame is swung by the cam, but these devices move back over the wire when the frame is swung by the spring 188. The wire feeding cam 192 is shown in detail in Figs. 38 and 39 of the drawings.

*Latch holding and transferring jaws.*

The latch holding and transferring jaws 186 are carried by a swinging arm 194. This arm is keyed to the upper end of a vertical shaft 195, mounted in a sleeve bearing 196, carried by the bed plate of the machine. At the lower end of the shaft 195 is a gear 197, which is adapted to be engaged by a segment rack 198, carried by a lever 199, see Figs. 43 and 44. This lever 199 is pivoted at 200 to a suitable supporting bracket 201. Said lever carries a roller 202 adapted to engage a face cam 203, carried by the shaft 8. The face cam 203 for operating the swinging jaws is shown in detail in Figs. 45 and 46 of the drawings. As this cam rotates, the shaft 195 will be given a partial rotation, first in one direction and then the other, with proper periods of dwell at each end of its stroke. The swinging jaws 186 consist of a lower fixed jaw 186$^a$ and an upper movable jaw 186$^b$. These jaws are pivoted at 204. The movable jaw extends rearwardly to a point directly over the axis of the shaft 195. A spring 205, underneath the free end of the jaw, raises the same, depressing the outer end, and causing the jaws to clamp the latch. The jaws are separated by means of a lever 206, which carries an adjustable screw 207, adapted to engage the movable jaw 186$^b$ at a point directly over the axis of the shaft 195, so that, as this shaft 195 oscillates, the screw 207 will always be directly above the end of the movable jaw 186$^b$. The lever 206, see Fig. 22, is pivoted at 208 to the bracket 145. This lever carries a roller 209, which is adapted to engage the cam 210 on the shaft 8. This cam 210 is shown in detail in Fig. 47 of the drawings. The jaws swing from a position adjacent the trimming members which severs the latch from the wire stock, to a position where the latch is inserted in the slot in the needle. When in a position adjacent the trimming members, the latch is fed between the jaws, after which the jaws clamp the latch and then the arm 194 swings so as to carry the latch severed from the stock to a point where it may be inserted in the slot in the needle.

At the latch inserting station the needle is brought forward by the moving chuck over a supporting or positioning post 211. It is essential that the needle shall be held in a predetermined registering position, so that the latch will be moved by the jaws into the slot, said latch being crowded in along side of the shim of paper where it will be held frictionally after release by the jaws, until the needle comes to the rivet inserting station. The supporting and positioning post 211 is adjustably mounted on a bracket 212. Said bracket is secured to the bed plate of the machine by screws 213, which pass through slots, permitting the supporting post to be shifted in a direction toward and from the chuck. The supporting post is secured to the bracket by screws 214, which pass through slots positioned so as to permit the supporting post to be vertically adjusted. The supporting post has an upwardly projecting ledge 215 with a tapered face 216, which engages the point of the needle if slightly bent so as to deflect the needle and bring the same to proper position relative to the swinging jaws, so that the hole in the latch will register with the holes in the cheeks of the needle forming the needle slot, or, if the hole is to be drilled in the needle, to a point where when said hole is drilled, the drill will pass through the hole in the latch. Directly over the needle, when positioned above the supporting post 211 is a guiding arm 217, which is formed with a notch 218 in its underface, which coöperates with the supporting post in positioning and holding the needle in proper place for the latch to be inserted. This guiding arm is capable of vertical movement at its outer end. Said arm is mounted on a short shaft 218'. Said arm is connected to this shaft by a screw 219 which passes through a slot in the guiding arm so that it may be adjusted. The shaft 218' is journaled in a bracket 220. At the other end of the shaft 218' there is an arm 221, which has a downwardly projecting pin 222. This guiding arm 217 performs another function. Said arm has its outer end 223 inclined and this inclined face at the outer end of the arm, serves as a means for swinging the latch if the same is not properly positioned in the jaws, so as to cause the end of the latch to enter the slot with the hole in the latch in proper register with the openings in the cheeks of the needle. This will be clear from Fig. 49 of the drawings, which shows the position of the needle, supporting post, the guiding arm 217 and the latch inserted in the slot in the needle. The pin 222 is adapted to engage a cam plate 224, carried by the arm 194. When the swinging jaws move to the inserting station, the pin 222 slides down the cam 224. A spring 225 engages an arm 226 carried by the shaft 218' and causes the pin to follow this cam. This movement of the pin down the cam 224 lowers the guiding arm 217. When the arm 194 swings to bring the jaws again to a position adjacent the trimming members, then this guiding arm 217 will be raised by the pin 222 sliding up the cam 224. The spring arm 227 carried by the shaft 218' engages the paper shim and holds it down so as to insure the latch passing over the same.

After the latch has been inserted in the slot in the needle, the lever 206 is depressed which causes the jaws to open to release the latch. It is noted that the inner faces of the jaws are corrugated, as indicated at 186ᶜ in Fig. 41 of the drawings. This enables the jaws to firmly grip the latch. It is understood, of course, that the movement of the jaws is timed not only with the trimming devices, but also with the moving chucks, so as to transfer the latch and insert the same in the slot in the needle while the needle is stationary and is held by the chuck at the inserting station. After the latch has been inserted in the needle, and the jaws have released the same, the chuck carrying the needle is withdrawn and the needle is then moved to the drilling or reaming station.

*Drilling or reaming station.*

The needle with the inserted latch is moved forward by the chuck at the drilling or reaming station to bring the needle over the supporting bracket 228. Said supporting bracket has an inclined edge 229, and also a ledge 230, with an inclined face, which guides the point of the needle so as to bring the holes in the needle, if they have been previously formed therein, into alinement with the reamer, or to bring the needle into proper position for the drill, if the holes are to be drilled. A yielding guide 231 coöperates in the positioning of the needle. The drill or reamer is indicated at 232 in the drawings. Said drill or reamer is carried by a rotating shaft 233, which is mounted to rotate in suitable bearings 234 and 235, carried by a main bracket 236, which in turn is mounted on the bed plate of the machine. Mounted on the shaft 233 is a belt wheel 236' and a suitable belt runs over this belt wheel and idle pulleys 237. This belt in the present machine is driven from an overhead shaft, which is independent of the machine.

The drill or reamer is raised or lowered by means of a lever 238, which is pivoted at 239 to the bracket supporting the shaft for the drill or reamer. The lever 238 is operated by a main lever 240, which carries a roller 241 adapted to engage a cam 242 mounted on a shaft 8ᵃ. The shaft 8ᵃ is carried in suitable brackets attached to the bed plate of the machine. The lever 240 is pivoted at 243 to the bracket supporting the drill or reamer. An adjustable screw 244, carried by this lever 240, is adapted to engage the underface of the other end of the lever 238, so that, when the lever 240 is raised by the cam 242, the lever 238 will be positively raised, lowering the end thereof connected to the drill or reamer, so as to force the drill or reamer downwardly. A spring 245, connected to the lever 240 and to an arm 246 on the lever 238, serves as a means for returning the drill or reamer. If the cheeks forming the needle slot have been previously punched or drilled, then the reamer is used which serves to clear the holes in the needle and also line up the hole in the latch for the insertion of the rivet therein. If a drill is used then the cheeks of the needle forming the slot are drilled in alinement with the hole in the latch, so as to receive the rivet for the latch. After the drilling operation has been completed, then the chuck moves the needle away from the drilling station, the carrier operates to progress the chuck another step and to the rivet inserting station.

*Rivet inserting station.*

The rivet inserting station is shown more particularly in Figs. 52 to 60, inclusive. At the rivet inserting station the needle is again moved forward by the chuck until it is brought over the supporting bracket 247, which is connected for vertical adjustment with a main bracket 248, which carries the wire feeding and cutting devices for inserting the wire forming the rivet and the cutting of the wire after the rivet is in place. This supporting bracket 247 has an inclined edge 249; also a projecting ledge 250, with an inclined face, which is adapted to engage the point of the needle, if the needle is slightly bent or improperly held by the chuck, so as to position the needle with the holes extending therethrough and through the latch in alinement with the wire from which the rivet is to be formed. Coöperating with the bracket is a yielding guide 251, which is adjustably connected to the bracket. The wire for forming the rivet is led from a suitable source of supply to the wire feeding and cutting devices. Mounted on the bracket 248 is a slide 252. Pivotally connected to the slide 252 are wire cutting jaws 253 and 254. These jaws are pivoted at 255. The jaws carry wire cutters 256 and 257, respectively. A spring 258 normally operates to separate the cutting members. A wedge 259, movable between the adjustable screws 260 and 261, carried, respectively, by the jaws 253 and 254, serve to separate these jaws bringing the cutting members together to sever the wire. The wire passes through a suitable guiding opening 262 in the wedge and a guiding opening 263 in the jaws and the pivot support therefor, and thence through a tension device, indicated at 264 in Fig. 52 of the drawings. This tension device is carried by the bracket and does not slide with the jaws, as clearly shown in Fig. 55 of the drawings. The tension device consists of a block 265, in front of which the wire passes, and a disk 266, which is pressed by a spring 267 against the wire. The knurled nut 268 engages the spring and serves as a means for adjusting the tension on the wire. The slide carrying the jaws is raised and lowered by a lever 269, which is fulcrumed at 270 on a bracket 248, and this lever is connected to a link 271, which is in turn connected to the slide, so as to move the same up and down in suitable guideways on the bracket 248. The lever 269 is provided with a roller 272, which is adapted to coöperate with a feed cam 273. This feed cam is shown in dotted lines in Figs. 57 and 60 of the drawings. The wedge for operating the jaws to sever the wire is adjustably carried by a lever 274. Said lever is fulcrumed at 275 on the slide which carries the jaws, so that the lever moves bodily up and down with the jaws. At the outer end of the lever 274, there is a head 276 having a recess for the plate 277, which carries the wedge 259. The plate 277 is bent laterally at the upper end, as indicatied at 278, and is provided with two screws 279 and 280. The screw 279 is threaded into the head 276 and the head of this screw rests against the plate. This screw serves as a limiting screw to limit the upward adjustment of the plate and the wedge carried thereby. The screw 280 bears against the head 276 and serves as a means for raising the plate. Through these screws 279 and 280, the wedge may be raised and lowered, so as to change the working position of the wedge and by manipulating the screws 260 and 261 the throw of the jaws may be further varied independently or together, so that through these adjustments just the right position of the jaws may be obtained and the right throw of the jaws secured for cutting the wire. The lever 274 carries a roller 281 which is adapted to bear against the cam 282. This cam 282 is shown in detail in Figs. 58 and 59 of the drawings. The cam 282 and also the rivet feed cam 273 are each mounted on the shaft $8^a$, described above, and are rotated thereby. The lever 269 is held against its coöperating cam by a spring 283, which is attached at one end to the lever and at the other end to the bed plate 3. Mounted on this lever 269 is a sleeve 284, which carries a stop screw 285. This stop-screw is adapted to engage a post 286 carried by the bed plate 3. By adjusting this screw 285 the upward movement of the feed slide may be varied, and this, of course, determines the length of wire which is fed forward by the feed slide through the action of the cam and the length of rivet which is formed by the cutting devices. The lever 274 is held in engagement with its operating cam by a spring 286′ which is attached at one end to the lever and at its other end to the bed plate 3.

From the above, it will be noted that a length of wire is moved forward by the downward movement of the slide through the tension devices, gripping the wire, and this wire is inserted in the hole in the cheeks of the needle and in the hole in the latch. After it has been positioned in the needle, then the cutting devices will be operated by the actuating cam therefor to sever the wire and to form the rivet. The rivet is frictionally held in place until it is brought to the riveting station. After the rivet has been inserted in the needle then the chuck withdraws the needle and the carrier again moves a step forward to bring the chuck opposite the riveting station.

*Riveting mechanism.*

The riveting mechanism for heading the rivet is shown more clearly in Figs. 61 to 72, inclusive. Before describing the riveting mechanism, I will describe in brief the headed rivet which attaches the latch to the needle and which is headed on my improved riveting mechanism. The rivet is formed with a ball-shaped center section which serves as a bearing for the latch and which serves, also, to hold the cheeks of the needle spaced so as to permit the upsetting or heading of the rivet. This ball-shaped section is indicated at $r'$ in Fig. 71. Each side of the needle is formed with a recess $n'$. This recess extends longitudinally of the needle and is slightly less in width than the diameter of the opening $n^2$ which receives the rivet. The riveting mechanism forms heads on the rivet which are oblong and fill the respective recesses $n'$ at each side of the needle. These oblong heads are indicated at $r^2$ in the drawings.

The riveting mechanism consists broadly of two coöperating dies which operate first to center the rivet in the needle so that it projects the same distance from each side of the needle and then by a series of light blows to ball the center of the rivet, as at $r'$ and then head the rivet at each end thereof, as at $r^2$. A riveting mechanism is carried by a standard 287 mounted on the bed of the machine and is secured thereto by suitable bolts 288. This standard has a dove-tail recess 289 formed therein, see Fig. 63. Mounted on the standard 287 is a bracket 290 which is formed with a section 291 dovetailed in cross section and conforming to the dovetail recess. This section 291 slides horizontally in the dovetail recess 289 and this affords a very durable support for the bracket 290 and at the same time permits the same to move horizontally back and forth. Mounted on the bracket 290 are two coöperating riveting dies 292 and 293. The die 292 is carried by a supporting plate 294 which is bolted to the bracket 290 by suitable bolts 295. The plate 294 is formed with a vertical recess 296, in which the lower die 292 is located. Said die is held in the slot by means of a set screw 297. Extending underneath the die and located in the slot is a wedge 298. The upper surface of the slot is inclined, as indicated at 299, see Fig. 67. The wedge serves as an adjustable means for supporting the rivet die 292. The wedge is forced inwardly by means of a screw 300 which is threaded into the plate 294, and the inward movement of the wedge is limited by a screw 301 which bears against the face of the plate 294. This provides a very simple means for supporting the rivet die 292 and at the same time permits said die to be readily adjusted vertically and to be held in adjusted position by the set screw 297.

The upper riveting die 293 is carried by a rod 302. This rod 302 is rectangular in cross section and said rod fits in a similarly shaped opening formed in the bracket so that the rod may reciprocate vertically but is held from turning on the bracket. At the lower end of the rod 302 there is a head 303 having a slot for the riveting die 293 and said riveting die is held in the slot by a set screw 304. At the upper end of the rod 302 there is a yoke head 305 which carries a roller at 306. Coöperating with the roller 306 is a rotating eight-sided cam 307. The faces of the cam are straight and said faces are disposed the same distance from the center of the cam. Said cam is carried by a horizontal shaft 308 which is mounted in suitable bearings on the bracket 290 and is rotated by a belt wheel 309 operated by a belt 310. The yoke head 305 is provided with projecting arms 311. Mounted on the bracket 290 is a forwardly projecting arm 312 and carried by this arm is a cross bar 313. Springs 314 connect each end of the cross bar 313 with the arms 311, respectively. The cross bar may be raised or lowered by a screw 315 and thus the tension on the spring varies. These springs normally operate to raise the upper die holding the roller 306 against the rotating cam 307. As the cam rotates the rod 302 will be forced downwardly and then again raised a number of times for each rotation of the shaft 308. By this means I am able to impart to the dies a series of very short strokes and, therefore, light blows to the rivet. The bracket 290 is moved forward on the standard by means of a cam 316. This cam is mounted on the shaft 8ª. Mounted on the bracket 290 is an adjustable arm 317. Said arm is slotted at 318 to receive a bolt 319. At the outer end of the arm there is a roller 320 which bears against the cam 316. By loosening the bolt 319 the arm may be adjusted by means of an adjusting screw 321. The roller is forced toward the cam by means of a spring 322 which is connected at one end to a pin 323, carried by the bracket, and at the other end to a pin 324 carried by the standard. This cam 316 is concentric throughout a greater portion of its extent and operates to progressively move the bracket carrying the riveting dies forward and then permitting the bracket and dies to be quickly returned to their normal rearward position.

At one side of the dies there is a guide arm 325 for directing the needle as it is presented to the dies. This guide arm is adjustably secured by a screw 326 to the standard. Said guide arm is located between guiding flanges 327 and is formed with a slotted end 328 through which the screw 326 passes. Each die is formed with a V-shaped groove, indicated at 329. These grooves are similar in construction and each groove is of a maximum depth at the extreme forward edge of the die and gradually decreases in depth to a point midway between the front and rear faces of the die where it vanishes into a flat surface. When the needle is moved forward by the chuck holding the same, the guide arm 325 will direct the point of the needle between the dies and the rivet into these V-shaped recesses in the faces of the dies. When the chuck reaches its extreme forward position, the rivet has just entered the V-shaped recesses. As the upper die moves up and down the first operation is to center the rivet in the needle. If the rivet is slightly raised so that more stock is above the needle than below, then the front portion of the V-shaped groove of the upper die will strike the rivet and move it downwardly until there is the same amount of stock above and below the needle. The flat portion of the dies practically engages the flat side cheeks of the needle and centers the same so that, when the riveting operation begins, there will be the same amount of stock both above and below the needle. The upper die reciprocates very rapidly and imparts very light blows to the rivet for the reason that the distance between the opposed surfaces of the dies at the extreme outer edge of the V-shaped recess is substantially the length of the rivet. While the upper die is reciprocating the upper bracket is moved forwardly gradually progressing the dies on to the rivet and carrying the section of the recesses in the dies which are smaller into coöperative action and finally bringing the flat sections of the dies into action. It will thus be seen that, as the riveting die moves forward, the rivet will be engaged by the die and a series of light blows imparted thereto. As the rivet shortens by the upsetting of the same, the blow is maintained substantially the same— that is, it is very light. This results in the balling of the rivet, as indicated at $r'$ in Fig. 71, which forms a suitable bearing for the latch and also forms a support for the cheeks of the needle to hold the same while the heading of the rivet takes place. After the center has been shaped, as above noted, then the heads of the rivets are formed. The width of the center of the oblong head of the rivet is enough narrower than the diameter of the stock from which the rivet is formed so as to support the rivet when being headed and prevent the rivet from turning and insuring that the oblong heads will be properly formed and seated in the respective recesses in the faces of the needle. The V-shaped recesses insure the forming of the head so as to fit the recesses and when the rivet is finished or finally headed the outer faces of the rivet are flush with the outer walls of the needle so that there are no projecting parts to catch on the yarn.

After the needle latch has been riveted to the needle this finishes the operation of securing the latch to the needle and the needle is then moved to the station where the hook on the end of the needle is formed.

*Needle hook forming mechanism.*

When the needle is brought to the station for forming the hook thereon, the chuck moves forward carrying the end of the needle over a rotatable turret 339. Directly above the turret is a bracket arm 340 having guiding members 341 for directing the needle, so as to bring it into proper position relative to the turret. These guiding members are suitably carried by said bracket arm 340, and may be adjusted thereon so as to bring the needle to the proper position. Directly above the turret is a slide 343, carrying a post 344, around which the hook of the needle is formed. Said post is fixed to a swinging arm 345, which is pivoted at 346 to the slide 343. This swinging arm is loosely mounted on its pivot support so that it is capable of adjustment sidewise relative to the slide and also out and in relative to the slide at the lower end thereof. Said slide is provided with spaced posts 347, each of which carries an adjustable screw 348. The arm suspends between these posts and these screws serve as a means for adjusting the lower end of the arm laterally. A set screw 352 passes through the slot 350 in the arm, and is threaded into the slide 343 in rear thereof. Said set screw is free in the slot. A set screw 351 is threaded into the arm and at its inner end bears against the face of the slide 343. By means of these two set screws the arm may be shifted slightly toward or from the cross head, and also be held clamped in adjusted position. The set screw 349 is threaded into the arm and bears against the shank of the post 344 and holds the same in place in the arm.

It will be apparent from the above that this post 344 through the adjustment stated may be shifted in any direction, so as to properly position the same, whereby the end of the needle may be bent around the post to form the hook.

The rotating turret 339 is mounted on a shaft 353, which is journaled in a suitable bearing sleeve 353$^a$ carried by a supporting base 354, which in turn is adjustably connected to the bed plate. This base 354 has elongated slots 355 adapted to receive suitable screws, by means of which the base plate may be shifted bodily to bring the hook forming mechanism into proper coöperation with the chucks for operating upon needles of different types. Secured to the shaft 353 is a gear wheel 356. A rack bar 357 sliding in a recess 358 in the base 354, engages this gear and is adapted to rotate the turret. This rack bar, as clearly shown in Fig. 82 of the drawings, extends rearwardly and is operated by a lever 359. The lever 359 is pivoted at 360 and carries a roller 361, which is adapted to engage a groove 362 in a cam drum 363. The lever 359 is adjustably connected at its lower end, through a block 364, with the rack bar 357. Mounted on the turret is a pivoted dog 365. Said dog is pivoted at 366 to said turret. The dog has an upwardly projecting bearing carrying a roller 367. A spring 368 is interposed between a block 369 on the turret and the dog and normally presses the dog into engagement with a stop pin 370. This dog has an outwardly extending arm 371, which is adapted to engage an adjustable screw 372, carried by a bracket arm 373, secured to the bracket 342.

The slide 343 is raised by a spring 376, which engages at one end a pin 377, carried by the slide and at its other end a pin 378, carried by the bracket 342. The slide is forced downwardly by a lever 379, which is pivoted at 380 to this bracket 342. Said lever carries at its outer end an adjustable screw 381, which is adapted to engage the upper end of the slide. Said lever carries at its other end a roller 382, coöperating with a cam 383 on the shaft 8ª. A spring 384, engaging the lever 379 at one end and the base 354 at its other end, holds the roller 382 in contact with its actuating cam.

It is thought the operation of the hook forming mechanism will be apparent from Figs. 77 to 79 of the drawings. In Fig. 77, the turret has been rotated in the direction of the arrow, so as to bring the end of the dog 365 into engagement with the adjustable screw 372. This moves the roller on the end of the dog to a point where it is clear of the needle, so that the needle may be moved forward over the turret. The slide 343 is located so as to bring the post 345 alongside of the needle. The rack bar 357 is then operated to return the turret and as the turret returns, moving the dog away from the adjustable screw 372, the spring 368 forces the dog against the needle and the roller moving about the post to the position shown in Fig. 79, bends the end of the needle about the post, thus forming the hook. The post at its lower end is, of course, shaped so as to bring about a proper shaping of the hook of the needle.

The roller 367 has a groove 367ª formed adjacent its upper end, which engages the end of the needle and insures that the hook be bent in a horizontal plane. After the hook has been formed the turret continues its movement so as to bring the arm 385 into engagement with an adjustable stop-screw 386. Loosely mounted directly underneath the turret head 339 is a disk 387 and this disk carries the arm 385. It also carries the stop pin 370. The disk 387 is free from both the turret 339 and the shaft 353 except that its movement is limited by the stop pin 370 engaging the ends of the slot 388 formed in the turret head 339. When the dog is free from engagement with the stop-pin, the spring moves the same against the pin 370 and forces the pin to the end of the slot 388, which serves to limit the movement of the dog. When the arm 385 comes into engagement with the stop-screw 386, then the disk 387 will be held from movement and the pin 370 will ride along the slot 388 and move the dog 365, so as to carry the roller 367 away from the needle. This releases the roller from the needle after the hook is finished. The post 344 is then raised and the needle may be withdrawn, after which the turret is returned to its normal position, as shown in Fig. 79, ready for the insertion of another needle. By adjusting the stop-screws 372 and 386, the movement of the roller toward and away from the hook may be varied.

The bearing sleeve 353ª which supports the turret is capable of slight vertical adjustment in the frame 354. The upwardly projecting portion of the frame 354 has an inclined slot 389, which receives a projecting rod 389ª. The sleeve is held in an adjusted position by a set-screw 389ᵇ. By loosening this set-screw and turning the projecting rod 389ª, the sleeve 353ª may be raised or lowered and then the set-screw is again tightened to hold the sleeve in this adjusted position. This permits of a slight vertical adjustment of the turret to insure the roller with the groove therein being properly positioned for engaging the needle to form the hook.

*Latch shank breaking mechanism.*

When the chuck is brought in front of the latch breaking mechanism, it is moved forward to position the needle, so that the waste stub end may be brought into position to be engaged by the breaking device. As the needle moves forward, it is guided by a supporting member 390. Mounted directly above the latch, while in this position, is a shaft 391, having a forked end 392, which is adapted to engage the waste stub end of the latch. This shaft is raised by a lever 393, which engages underneath a collar 394, secured to the shaft. The lever is fulcrumed at 395 to the bracket 342. Said lever carries an adjustable screw 396, which is located in the path of the lever 379, so that as the lever 379 is depressed by the spring 404, the lever 393 will be raised and when the lever 379 is raised by the cam, lowering the post around which the hook is formed, it also lowers the shaft 391. A spring 397 operates to move the shaft 391 downwardly. This downward movement of the shaft causes the forked end 392 to engage the latch. One member of the forked end 392 is longer than the other, as clearly shown in Fig. 82 of the drawing. When the needle is moved forward by the chuck, the latch is brought against this long end of the fork which insures the forked end moving down into proper engagement with the latch. The shaft is vibrated rapidly by means of a segment gear 398, which is engaged by a rack 399 carried by a lever 400, pivoted at 401 and operated by a roller 402, coöperating with a series of cams 403, formed on the drum 363. As the shaft 8$^a$ rotates, it will cause this shaft 391 to be vibrated rapidly and this will bend the waste stub end of the latch until it is broken at the place where it is notched. The roller 402 is held in engagement with the cams 403 by a spring 404. The spring 404 is connected to a pin 405 on the segmental gear 398 and to a pin 406 on the frame (see Fig. 3). This pin 406, as clearly shown in Fig. 2, is out of line vertically with the pin 405, so that the spring 404 not only forces the shaft 391 downwardly, but also tends to rotate the shaft in a counterclockwise direction looking down on the same. This assists the lever 400 in the vibration of the shaft 391. The guide 390 is carried by a bracket on the frame and built about this guide is a box 407, adapted to receive the broken off ends of the latches.

It is understood that when the paper shim is in place and the latch riveted, the latch is held more or less rigidly in the position in which it is riveted. When the needle is tempered, the paper shim burns away and this allows the latch to swing freely. This rigid position of the latch while the paper is in place facilitates very greatly the handling of the needle and insures that the latch stub end will be engaged by the forked end 392 of the shaft 391. This finishes the needle and the latch, so far as this machine is concerned. As a matter of fact, the needle and latch are finished except for the grinding of the end of the latch. Further movements of the endless carrier cause the chucks to be retracted and to remain in retracted position, as they are now out of contact with the controlling bar 49. As the chucks pass the plates 71, the clamping lever is released and the needles drop from the chucks into the pan for the same, as described above.

*Operation.*

It will hardly be necessary to describe in detail the operation of the machine, as it will be obvious from the description above given. It may be stated, briefly, however, that the needles which are formed, except for the bending of the hook, are placed in the pan 69 and are taken one at a time and placed in the chucks as they pass from under the pan, and clamped in the chucks. As the endless carrier moves the chucks present the needles first to one station and then another, where the various operations are performed. At the first station B, the paper shim is formed and placed in the slot in the needle and the corner of the paper crimped or bent to hold the paper shim in place. This paper shim is formed from a continuous strip of paper which is fed forward and cut to form the shim. The latches are made in the machine and from stock material, such as wire, which passes through suitable devices which notch the wire, to form the recess for housing the point of the needle and the sides of the latch, punch the latch and finally cuts the latch from the stock material. This occurs at the station indicated at C in the drawings. The finished latch is then conveyed by the holding and transferring jaws to the station D, where it is inserted in the needle. The end of the latch being crowded in beside the paper serves to hold the latch in the needle, so that it may be moved to the next station. At the next station, indicated at E, the hole in the needle cheeks forming the slots, are either reamed or drilled and the hole in the latch brought into alinement therewith. At the next station, indicated at F, a rivet is inserted in the holes in the needles and in the latch and cut to the right length for riveting the latch in the needle. At the next station, indicated at G in the drawings, the rivet has imparted thereto a series of light blows which properly form the rivet and the heads thereon. At the next station, indicated at I, the needle hook is formed and then the needle passes through the station, indicated at J, where the waste stub end of the latch is broken off.

It will be noted from the above that a full automatic machine has been provided which forms the latches and inserts them in the needle slot and secures the latches therein.

It is obvious that minor changes may be made in the arrangement of parts and in the various details of construction without departing from the spirit of the invention, as set forth in the appended claims.

Having thus described my invention, what I claim as new and desire to secure by Letters Patent, is:

1. The combination of a needle holding chuck, means for forming a needle latch, means for inserting the latch in the slot of a latch needle, and means for securing the latch in said slot.

2. The combination of a needle holding chuck, means for forming a needle latch, means for inserting the latch in the slot of a latch needle, means for forming and placing the rivet for securing the latch to the needle, and means for heading said rivet.

3. The combination of means for forming a needle latch, means for inserting the latch in the slot of a latch needle, means for securing the latch in said slot, a needle holding chuck, and means for operating said chuck for presenting the needles in succession to the latch inserting means and to the latch securing means.

4. The combination of means for forming a needle latch, means for inserting the latch in the slot of a latch needle, means for reaming the holes in the needle and the latch, means for inserting a rivet in said holes, means for heading said rivet, and means for presenting the needles in succession to the latch inserting means, the reaming means, the rivet inserting means and the riveting means.

5. The combination of means for forming a needle latch, means for inserting the latch in the slot of a latch needle, means for reaming the holes in the needle and the latch, means for inserting a rivet in said holes, means for heading said rivet, an endless carrier, a series of chucks mounted on said carrier, a needle holding device on each chuck, and means for operating the carrier and the chuck for presenting the needles one after another and in succession to the latch inserting means, the reaming means, the rivet inserting means and the riveting means.

6. The combination of means for forming a needle latch, means for inserting the latch in the slot of a latch needle, means for securing the latch in said slot, an endless carrier with a series of chucks mounted thereon, a needle holder on each chuck, and means for operating the carrier and the chucks for presenting the needles one after another and in succession to the latch inserting means and the latch securing means.

7. The combination of means for forming a needle latch, means for inserting the latch in the slot of a latch needle, means for securing the latch in said slot, an endless carrier with a series of chucks mounted thereon, a needle holder on each chuck, means for operating the carrier and the chucks for presenting the needles one after another and in succession to the latch inserting means and the latch securing means, and means for releasing the needles from the chucks after the latches have been secured thereto.

8. The combination of means for forming a needle latch, means for inserting the latch in the slot of a latch needle, means for securing the latch in said slot, and means for presenting the needles one after another and in succession to the latch inserting means and the latch securing means, said needle presenting means including a chuck for each needle and means for clamping the needle to the chuck.

9. The combination of means for forming a needle latch, means for inserting the latch in the slot of a latch needle, means for securing the latch in said slot, means for presenting the needles one after another and in succession to the latch inserting means and the latch securing means, said needle presenting means including a chuck for each needle having needle positioning means and a spring actuated pivoted lever for clamping the needle to the chuck.

10. The combination of means for forming a needle latch, means for inserting the latch in the slot of a latch needle, means for securing the latch in said slot, means for presenting the needles one after another and in succession to the latch inserting means and the latch securing means, said needle presenting means including a chuck for each needle having needle positioning means and a spring actuated pivoted lever, said lever having devices for clamping the needle at two points on said chuck.

11. The combination of means for forming a needle latch, means for inserting the latch in the slot of a latch needle, means for securing the latch in said slot, means for presenting the needles one after another and in succession to the latch inserting means and the latch securing means, said needle presenting means including a chuck having a guiding ledge for the needle, an eccentrically disposed pin for endwise positioning the needle, a spring actuated lever coöperating with said pin for clamping the needle butt, and means for clamping the needle adjacent the outer end thereof.

12. The combination of means for forming a needle latch, means for inserting the latch in a slot of a latch needle, means for securing the latch in said slot, and means for presenting the needles one after another and in succession to the latch inserting means and the latch securing means, said needle presenting means including a traveling carrier, a chuck for each needle mounted on said carrier, means for clamping the needles to their respective chucks, a controlling bar associated with said chucks for moving certain of the chucks endwise to present the needles to the various operating means.

13. The combination of means for forming a needle latch, means for inserting the latch in the slot of a latch needle, means for securing the latch in said slot, and means for presenting the needles one after another and in succession to the latch inserting means and the latch securing means, said needle presenting means including an endless carrier, means for intermittently operating the same, a series of chucks mounted on said carrier, means for clamping a needle to each chuck, a controlling bar operating upon certain of the chucks for moving the same endwise for presenting the needles to the operating means.

14. The combination of means for forming a needle latch, means for inserting the latch in the slot of a latch needle, means for securing the latch in said slot, and means for presenting the needles one after another and in succession to the latch inserting means and the latch securing means, said needle presenting means including a series of connected links forming an endless carrier, means for intermittently operating the carrier, a chuck slidingly mounted on each link for movement transversely of the carrier, and means for clamping a needle to each chuck, and a controlling bar operating upon certain of the chucks for moving the same endwise for presenting the needles to the various operating means.

15. The combination of means for forming a needle latch, means for inserting the latch in the slot of a latch needle, means for securing the latch in said slot, means for presenting the needles one after another and in succession to the latch inserting means and the latch securing means, said needle presenting means including a series of connected links forming an endless carrier, means for intermittently operating said carrier, a chuck slidingly mounted on each link for movement transversely of the carrier, a spring actuated lever for clamping a needle on each chuck, means coöperating with the lever for positioning the needles on the chucks, a controlling bar, and means for moving the controlling bar transversely to the movement of the endless carrier, said controlling bar having means for engaging certain of the chucks for moving the same endwise to present the needles to the various operating means.

16. The combination of means for forming a needle latch, means for inserting the latch in the slot of a latch needle, means for securing the latch in said slot, means for presenting the needles one after another and in succession to the latch inserting means and the latch securing means, said needle presenting means including a series of connected links forming an endless carrier, means for intermittently operating said carrier, a chuck slidingly mounted on each link for movement transversely of the carrier, a spring actuated lever for clamping a needle on each chuck, means coöperating with the lever for positioning the needles on the chucks, a controlling bar, means for moving the controlling bar transversely to the movement of the endless carrier, said controlling bar having means for engaging certain of the chucks for moving the same endwise to present the needles to the various operating means, and means for engaging the spring actuated lever for releasing the needle from the chuck after the latch has been secured thereto.

17. The combination of means for forming a needle latch, means for inserting the latch in the slot of a latch needle, means for securing the latch in said slot, means for presenting the needles one after another and in succession to the latch inserting means and the latch securing means, said needle presenting means including a chuck for each needle and means for clamping the needle to the chuck, and means for releasing a needle from a chuck after the latch has been secured to the needle.

18. The combination of means for forming a needle latch, means for inserting the latch in the slot of a latch needle, means for securing the latch in said slot, a supporting bed on which said first means are mounted, a track extending lengthwise of the bed, an endless carrier including connected links sliding on the track, means for holding the links on the track, a chuck mounted on each link and capable of movement transversely of the movement of the link, and controlling means operating upon certain of the chucks to present the needles one after another and in succession to the various operating means.

19. The combination of means for forming a needle latch, means for inserting the latch in the slot of a latch needle, means for securing the latch in said slot, a supporting bed on which said first means is mounted, a track extending lengthwise of the bed, an endless carrier including connected links sliding on the track, means for holding the links on the track, a chuck mounted on each link and capable of movement transversely of the movement of the link, a controlling bar, means for supporting said bar and for moving the same transversely of the direction of movement of the carrier, said bar having devices for engaging certain of the chucks for moving the same to present the needles one after another and in succession to the various operating means.

20. The combination of means for forming a paper shim and inserting the same in the slot of a latch needle, and means for presenting the needles one after another to said paper shim forming and inserting means.

21. The combination of means for forming a paper shim and inserting the same in the slot of a latch needle, means for forming a needle latch, means for inserting the latch in the slot of the latch needle beside the paper shim, and means for presenting the needles one after another and in succession to the shim forming means and the latch inserting means.

22. The combination of means for forming a paper shim and inserting the same in the slot of a latch needle, means for forming a needle latch, means for inserting the latch in the slot beside the paper shim, means for reaming the holes in the needle and the latch, and means for presenting the needles one after another and in succession to the shim forming means, the latch inserting means and the reaming means.

23. The combination of means for forming a paper shim and inserting the same in the slot of a latch needle, means for inserting a needle latch in the slot beside the shim, and means for securing the latch to the needle.

24. The combination of means for forming a paper shim and inserting the same in the slot of a latch needle, means for inserting a needle latch in the slot beside the shim, means for securing the latch to the needle, and means for presenting the needles one after another and in succession to the shim forming means, the latch inserting means and the securing means.

25. The combination of means for forming a paper shim and inserting the same in the slot of a latch needle, means for inserting a needle latch in the slot beside the shim, means for inserting a rivet, means for imparting a series of light blows to the rivet for heading the same, and means for presenting the needles one after another and in succession to the various operating means.

26. The combination of means for forming a paper shim and inserting the same in the slot of a latch needle, means for inserting a needle latch in the slot beside the shim, means for reaming the holes in the needle and the latch, means for inserting and forming a rivet for securing the latch to the needle, means for giving a series of light blows to the rivet for forming a ball for a bearing for the latch and for heading the rivet, and means for presenting the needles one after another and in succession to the various operating means.

27. The combination of needle holding means, means for feeding a strip of paper and for inserting a portion of the end thereof in the slot of a latch needle, means for turning up the end of the paper projecting through the slot, and means for severing the paper to form a shim.

28. The combination of needle holding means, a guide for guiding a strip of paper, a feed dog for feeding the paper strip along the guide, adjustable means for imparting feeding movements to said feed dog, whereby a strip of paper may be moved along the guide and inserted in the slot of a latch needle, means for turning up the end of the paper projecting through the slot, and means for severing the strip of paper forming the paper shim.

29. The combination of needle holding means, a guide for guiding a strip of paper, a feed dog for feeding the paper strip along the guide, adjustable means for imparting feeding movements to said feed dog, whereby a strip of paper may be moved along the guide and inserted in the slot of a latch needle, means for turning up the end of the paper projecting through the slot, means for shifting the guide, and trimming members operated by the shifting of the guide for severing the paper to form the paper shim.

30. The combination of needle holding means, means for guiding a wire from which needle latches may be formed, means for notching the wire, means for forming the sides of the latch, means for recessing the latch, means for cutting the latch from the wire, and transferring means for receiving the latch and for inserting the latch in the slot of a latch needle held by said needle holding means.

31. The combination of needle holding means, means for guiding a wire from which needle latches may be formed, means for notching the wire, means for forming the sides of the latch, means for recessing the latch, means for cutting the latch from the wire, transferring means for receiving the latch and for inserting the latch in the slot of a latch needle held by said needle holding means, and means for moving the notching and recessing means while in engagement with the wire for feeding the wire.

32. The combination of means for guiding a wire from which needle latches may be formed, means for notching the wire to form a stub end which may be broken from the latch, devices coöperating to form the latch, means for supporting a needle, means for severing the formed latch from the wire, and means for transferring and inserting the formed latch in the slot of the needle held by the needle holding means.

33. The combination of means for guiding a wire from which needle latches may be formed, means for notching the wire whereby a stub end may be broken from a finished latch, devices coöperating to form the latch including means for recessing the latch and for punching the latch, means for cutting the latch from the wire, and devices for transferring and inserting the latch in the slot of the latch needle.

34. The combination of a needle holding chuck for supporting a latch needle, means for forming a needle latch, and means for receiving said needle latch and transferring and inserting the latch in the slot of the needle held by said chuck.

35. The combination of means for holding a needle, coöperating devices operating to form a needle latch, clamping jaws for receiving the formed needle latch and for inserting the same in the slot of a latch needle held by said holding means.

36. The combination of means for holding a needle, coöperating devices operating to form a needle latch, clamping jaws for receiving the formed needle latch and for inserting the same in the slot of a latch needle held by said holding means, means for separating the jaws to receive the latch, and means for separating the jaws to release the latch after it has been inserted in the slot of a needle.

37. The combination of means for holding a needle, coöperating devices operating to form a needle latch, clamping jaws for receiving the formed needle latch and for inserting the same in the slot of a latch needle held by said holding means, means for separating the jaws to release the latch after it has been inserted in the slot of a needle, and guiding means coöperating with said jaws for directing the end of the latch into the slot of a needle.

38. The combination of means for guiding a wire from which needle latches may be formed, means for notching the wire and forming a recess therein adjacent said needle, coöperating punches for forming the sides of the latch, means for punching a hole through the shank of a latch, means for severing the latch from the wire and for forming the end of the latch adjacent the hole punched therein, and means for moving the notching means for feeding the wire.

39. The combination of means for guiding a wire from which needle latches may be formed, a reciprocating member, a notching die and a recessing die carried thereby, means coöperating with said notching die and recessing die whereby the wire is provided with a notch and a recess adjacent the notch, coöperating punches for forming the sides of the latch, means for punching a hole through the shank of a latch, means for severing the latch from the wire and forming the end of the latch adjacent the hole therein, and means for oscillating said reciprocating members while the notching and recessing dies are in engagement with the wire for feeding the wire.

40. The combination of means for supporting a needle having a needle latch inserted in the slot therein, means for inserting a wire in the openings in the needle and the latch for forming a rivet, means for severing the wire after it has been inserted in the needle, and means for giving a series of light blows to the rivet for forming a ball for a bearing for the latch and for heading the rivet.

41. In a latch needle making machine, the combination of means for holding a latch needle having a latch inserted in the slot therein and a rivet in place for riveting, and means for giving a series of light and substantially uniform blows to the rivet for enlarging it intermediate its ends and for heading the same.

42. The process of riveting a latch to a needle consisting in subjecting a rivet to a series of light and substantially uniform blows to enlarge the rivet intermediate its ends and to head said ends.

43. The combination of means for holding a latch needle having a latch inserted in the slot therein, and a rivet in place for riveting, and coöperating riveting dies having their opposed faces inclined to each other, means for reciprocating one of the dies, and means for moving the dies bodily laterally for causing the rivet to be progressively engaged by said inclined surfaces.

44. The combination of means for holding a latch needle having a latch inserted in the slot therein, and a rivet in place for riveting, coöperating riveting dies, means for reciprocating one of said dies, each die having a V-shaped recess leading into a flat surface, and means for moving the dies laterally for causing the rivet to move along the V-shaped recesses on to the flat surfaces of the dies, whereby a series of substantially uniform light blows are given to the rivet as the heads are formed thereon.

45. The combination of means for holding a latch needle having a latch inserted in the slot therein, and a rivet in place for riveting, coöperating riveting dies, means for reciprocating one of said dies, said dies having means for positioning the stock from which the rivet is formed so that said rivet projects equally from each side of the needle, and for heading the rivet.

46. The combination of means for inserting a latch in the slot of a latch needle, means for securing the latch to the needle, and means for bending the end of the needle to form the hook after the latch has been secured therein.

47. The combination of means for forming a needle latch, means for inserting the latch in the slot of a latch needle, means for securing the latch to the needle, means for bending the end of the needle to form the hook after the latch has been secured to the needle, and means for presenting the needles one after another and in succession to the latch inserting means, the latch securing means and the hook forming means.

48. The combination of means for forming a paper shim and inserting the same in the slot in the latch needle, means for inserting a needle latch in the slot beside the shim, means for securing the latch to the needle, means for bending the end of the needle to form the needle hook after the latch is secured to the needle, and means for presenting the needles one after another and in succession to the various operating means.

49. The combination of means for forming a paper shim and inserting the same in the slot of a latch needle, means for forming a needle latch and inserting the same in the slot beside the shim, means for riveting the latch to the needle, means for bending the end of the needle to form the hook after the latch has been secured to the needle, and means for presenting the needles one after another and in succession to the various operating means.

50. The combination of means for forming a paper shim and inserting the same in the slot of a latch needle, means for forming a needle latch and for inserting the same in the slot beside the shim, means for reaming the holes in the needle and the needle latch, means for inserting a rivet in the holes, means for giving a series of light blows to the rivet for heading the same, means for bending the end of the needle to form the needle hook after the latch has been riveted to the needle, and means for presenting the needles one after another and in succession to the various operating means.

51. The combination of means for forming needle latches from wire and notching the wire adjacent the recess in the latch to form a stub end which may be broken from the latch, means for inserting the latch in the slot of a latch needle, means for riveting the latch to the needle, and means for engaging said stub end and breaking the same from the latch.

52. The combination of means for forming needle latches from wire and notching the wire adjacent the recess in the latch to form a stub end which may be broken from the latch, means for inserting the latch in the slot of a latch needle, means for riveting the latch to the needle, and means for engaging said stub end and breaking the same from the latch, said last named means including an oscillating shaft having a forked end adapted to straddle the stub end for bending the same to break the stub end from the latch.

53. The combination of means for forming needle latches from wire and notching the wire adjacent the recess in the latch to form a stub end which may be broken from the latch, means for inserting the latch in the slot of a latch needle, means for riveting the latch to the needle, means for engaging said stub end and breaking the same from the latch, and means for presenting the needles one after another and in succession to the various operating means.

54. The combination of means for forming needle latches from wire and notching the wire adjacent the recess in the latch to form a stub end which may be broken from the latch, means for inserting the latch in the slot of a latch needle, means for riveting the latch to the needle, means for engaging said stub end and breaking the same from the latch, said last named means including an oscillating shaft having a forked end adapted to straddle the stub end for bending the same to break the stub end from the latch, and means for presenting the needles one after another and in succession to the various operating means.

55. The combination of means for forming a paper shim and inserting the same in the slot of a latch needle, means for forming needle latches from wire stock and notching the wire so that the stub end may be broken from the latch, means for inserting the latch with the stub end thereon in the slot beside the paper shim, means for inserting a rivet, means for upsetting the heads of the rivet, means for bending the end of the needle to form the needle hook after the latch has been riveted to the needle, means for breaking the stub end from the latch, and means for presenting the needles one after another and in succession to the various operating means.

56. The combination of means for forming a paper shim and inserting the same in the slot of a latch needle, means for forming needle latches from wire stock and notching the wire so that the stub end may be broken from the latch, means for inserting the latch with the stub end thereon in the slot beside the paper shim, means for inserting a rivet, means for upsetting the heads of the rivet, means for bending the end of the needle to form the needle hook after the latch has been riveted to the needle, means for breaking the stub end from the latch, means for presenting the needles one after another and in succession to the various operating means, said last named means including an intermittently operated endless carrier, a series of chucks carried thereby, means for clamping a needle to each chuck, and means for controlling the chucks for presenting the needles to the various operating means.

57. The combination of means for securing a latch to a latch needle and means for forming the hook on the end of a needle after the latch has been secured thereto, said last named means including a rotating turret, and yieldingly mounted roller carried thereby for engaging the end of the needle, a post around which the hook is bent, and devices for holding the roller from engagement with the needle while it is being positioned and for disengaging the roller from the needle after the hook is formed to permit the withdrawal of the hook.

58. The combination of means for securing a latch to a latch needle and means for forming the hook on the end of a needle after the latch has been secured thereto, said last named means including a vertically reciprocating post around which the hook is formed, a rotating turret, a dog mounted on the turret and carrying a roller for engaging the end of the needle to form the hook, said roller having a groove formed therein engaging the end of the needle.

59. The combination of means for securing a latch to a latch needle and means for forming the hook on the end of a needle after the latch has been secured thereto, said last named means including a vertically reciprocating post around which the hook is formed, a rotating turret, a dog mounted on the turret and carrying a roller for engaging the end of the needle to form the hook, said roller having a groove formed therein engaging the end of the needle, means for yieldingly moving the dog for causing the roller to engage the needle, and means operating to shift the dog to move the roller out of the way of the needle while the same is being positioned for the forming of the hook.

60. The combination of means for securing a latch to a latch needle and means for forming the hook on the end of a needle after the latch has been secured thereto, said last named means including a vertically reciprocating post around which the hook is formed, a rotating turret, a dog mounted on the turret and carrying a roller for engaging the end of the needle to form the hook, said roller having a groove formed therein engaging the end of the needle, means for yieldingly moving the dog for causing the roller to engage the needle, means operating to shift the dog to move the roller out of the way of the needle while the same is being positioned for the forming of the hook, and means for moving the dog to carry the roller out of engagement with the hook after it is formed to permit the release of the needle.

In testimony whereof I affix my signature.

JAMES M. DAYTON,
*Administrator of the estate of William H. Dayton, deceased.*